United States Patent [19]

Binns

[11] Patent Number: 5,692,419

[45] Date of Patent: Dec. 2, 1997

[54] DEFORMABLE LOCKING FASTENER SYSTEM AND METHOD OF USE

[75] Inventor: Lloyd S. Binns, Harbor City, Calif.

[73] Assignee: Air Industries Corporation, Garden Grove, Calif.

[21] Appl. No.: 485,110

[22] Filed: Jun. 7, 1995

Related U.S. Application Data

[63] Continuation-in-part of Ser. No. 26,345, Mar. 4, 1993, Pat. No. 5,452,974.

[51] Int. Cl.⁶ .................................................... B25B 13/00
[52] U.S. Cl. ........................ 81/124.3; 81/124.4; 411/3; 411/281
[58] Field of Search ........................ 81/121.1, 124.3, 81/124.4, 124.6, 53.2, 441, 185, DIG. 11; 411/281, 3

[56] References Cited

U.S. PATENT DOCUMENTS

| | | |
|---|---|---|
| Re. 28,907 | 7/1976 | Eibes et al. . |
| 445,166 | 1/1891 | Elliott . |
| 495,520 | 4/1893 | Sayre . |
| 930,450 | 8/1909 | Zinow . |
| 996,962 | 7/1911 | Baling . |
| 1,172,427 | 2/1916 | Carlson . |
| 1,389,927 | 9/1921 | Ball . |
| 1,603,618 | 10/1926 | McClellan . |
| 1,892,119 | 12/1932 | Thompson . |
| 1,966,835 | 1/1934 | Stites . |
| 2,202,240 | 5/1940 | Trotter . |
| 2,349,591 | 5/1944 | Hosking . |
| 2,349,592 | 5/1944 | Hosking . |
| 2,349,593 | 5/1944 | Hosking . |
| 2,370,352 | 2/1945 | Hosking . |
| 2,396,661 | 1/1946 | Keller et al. . |
| 2,546,332 | 3/1951 | Costello . |
| 2,596,885 | 5/1952 | Booth . |
| 2,651,230 | 9/1953 | Waterval ............................. 81/185 |

(List continued on next page.)

FOREIGN PATENT DOCUMENTS

| | | |
|---|---|---|
| 222771 | 7/1959 | Australia . |
| 659650 | 3/1963 | Canada . |
| 0273079 | 6/1988 | European Pat. Off. . |
| 1199636 | 12/1959 | France . |
| 1228099 | 3/1960 | France . |
| 1263619 | 5/1961 | France ............................. 81/DIG. 11 |
| 2301723 | 9/1976 | France . |
| 914082 | 7/1954 | Germany . |
| 516493 | 8/1963 | Germany . |
| 669037 | 12/1965 | Germany . |
| 6602955 | 6/1968 | Germany . |
| 1675031 | 12/1970 | Germany . |

(List continued on next page.)

OTHER PUBLICATIONS

Wing, George S. The Nova-Tek™ Fastening System, entire brochure, Oct. 27–29 1987.

*Primary Examiner*—D. S. Meislin
*Assistant Examiner*—Joni B. Danganan
*Attorney, Agent, or Firm*—Knobbe, Martens, Olson & Bear, LLP

[57] ABSTRACT

An improved deformable locking fastener system comprises a fastener, a deformable collar and a dedicated installation tool. The fastener has a threaded exterior defining a plurality of axial flutes which are configured to prevent the collar from prematurely capturing the fastener during installation. The collar comprises a cylindrical forward portion, a central portion having an elliptical cross-sectional shape and a rearward portion having an elliptical cross-sectional shape. The collar portions have axial heights selected to maximize the strength of the collar and to minimize the weight of the collar. The installation tool contacts the collar along driving ridges which reduces the radial compression of the collar and increases the tangential driving force turning the collar during installation. In addition, the installation tool includes oblique driving and swaging ridges which prevent premature cam-off of the installation tool when generating a desired preload and which swage collar material onto the fastener to lock the components together.

34 Claims, 11 Drawing Sheets

5,692,419
Page 2

U.S. PATENT DOCUMENTS

| | | |
|---|---|---|
| 2,796,107 | 6/1957 | Schwaiger . |
| 2,815,787 | 10/1957 | Podell . |
| 2,897,867 | 8/1959 | Torre . |
| 2,923,339 | 2/1960 | Skidmore . |
| 2,940,495 | 6/1960 | Wing . |
| 2,955,505 | 10/1960 | Schuster . |
| 3,034,611 | 5/1962 | Zenzic . |
| 3,139,786 | 7/1964 | Ardell . |
| 3,218,656 | 11/1965 | Reiland . |
| 3,311,147 | 3/1967 | Walker . |
| 3,340,920 | 9/1967 | Johnson . |
| 3,390,906 | 7/1968 | Wing . |
| 3,418,012 | 12/1968 | La Torre . |
| 3,421,562 | 1/1969 | Orloff et al. . |
| 3,433,280 | 3/1969 | Reusser . |
| 3,434,379 | 3/1969 | Wing . |
| 3,449,998 | 6/1969 | Wing . |
| 3,464,306 | 9/1969 | Reynolds et al. . |
| 3,492,908 | 2/1970 | Thurston . |
| 3,534,651 | 10/1970 | Belfigilo . |
| 3,578,367 | 5/1971 | Harvill et al. . |
| 3,603,132 | 9/1971 | Holmes . |
| 3,621,502 | 11/1971 | Velthoven . |
| 3,683,989 | 8/1972 | Follstaedt et al. . |
| 3,687,501 | 8/1972 | Wilson et al. . |
| 3,698,278 | 10/1972 | Trembley . |
| 3,746,067 | 7/1973 | Gulistan . |
| 3,750,732 | 8/1973 | Moebius . |
| 3,763,725 | 10/1973 | Reiland . |
| 3,789,726 | 2/1974 | Gill et al. . |
| 3,792,933 | 2/1974 | Stencel . |
| 3,854,372 | 12/1974 | Gutshall . |
| 3,865,007 | 2/1975 | Stanback . |
| 3,920,338 | 11/1975 | Dahl . |
| 3,930,428 | 1/1976 | Hale . |
| 4,005,740 | 2/1977 | Villo et al. . |
| 4,007,540 | 2/1977 | Tyree . |
| 4,061,367 | 12/1977 | Moebius . |
| 4,074,011 | 2/1978 | Teramae et al. . |
| 4,088,053 | 5/1978 | Tyree . |
| 4,176,582 | 12/1979 | Witte . |
| 4,260,005 | 4/1981 | Stencel . |
| 4,291,737 | 9/1981 | McMurray et al. . |
| 4,326,825 | 4/1982 | Volkmann et al. . |
| 4,383,353 | 5/1983 | Stencel . |
| 4,408,936 | 10/1983 | Williamson . |
| 4,472,096 | 9/1984 | Ruhl et al. . |
| 4,485,510 | 12/1984 | Hatter . |
| 4,544,312 | 10/1985 | Stencel . |
| 4,601,623 | 7/1986 | Wallace . |
| 4,682,520 | 7/1987 | Gray . |
| 4,735,537 | 4/1988 | Rath . |
| 4,742,735 | 5/1988 | Stencel . |
| 4,768,910 | 9/1988 | Rath . |
| 4,806,054 | 2/1989 | Rath . |
| 4,815,907 | 3/1989 | Williamson et al. . |
| 4,842,466 | 6/1989 | Wheeler et al. . |
| 4,877,363 | 10/1989 | Williamson et al. . |
| 4,957,401 | 9/1990 | Hatter . |
| 4,983,084 | 1/1991 | Gray . |
| 4,983,085 | 1/1991 | Gray . |
| 5,145,300 | 9/1992 | Wallace . |
| 5,148,727 | 9/1992 | Williamson . |

FOREIGN PATENT DOCUMENTS

| | | |
|---|---|---|
| 1750585 | 2/1971 | Germany . |
| 2208044 | 8/1973 | Germany . |
| 2355189 | 5/1974 | Germany . |
| 2411449 | 11/1974 | Germany . |
| 2350579 | 10/1975 | Germany . |
| 33-2507 | 2/1958 | Japan . |
| 40-23684 | 8/1965 | Japan . |
| 42-20950 | 10/1967 | Japan . |
| 45-27153 | 10/1970 | Japan . |
| 47-12818 | 6/1972 | Japan . |
| 47-29744 | 11/1972 | Japan . |
| 47-35454 | 11/1972 | Japan . |
| 48-36254 | 5/1973 | Japan . |
| 48-44658 | 6/1973 | Japan . |
| 48-50153 | 7/1973 | Japan . |
| 48-82260 | 11/1973 | Japan . |
| 48-96358 | 11/1973 | Japan . |
| 48-97557 | 11/1973 | Japan . |
| 49-1941 | 1/1974 | Japan . |
| 49-19164 | 2/1974 | Japan . |
| 49-65877 | 6/1974 | Japan . |
| 49-82852 | 8/1974 | Japan . |
| 49-91656 | 8/1974 | Japan . |
| 49-93761 | 9/1974 | Japan . |
| 50-77655 | 7/1975 | Japan . |
| 50-84663 | 7/1975 | Japan . |
| 50-137466 | 11/1975 | Japan . |
| 50-146761 | 11/1975 | Japan . |
| 50-153162 | 12/1975 | Japan . |
| 50-157759 | 12/1975 | Japan . |
| 51-34959 | 3/1976 | Japan . |
| 51-51654 | 5/1976 | Japan . |
| 51-83957 | 7/1976 | Japan . |
| 51-97661 | 8/1976 | Japan . |
| 51-136068 | 11/1976 | Japan . |
| 51-139867 | 11/1976 | Japan . |
| 51-148564 | 11/1976 | Japan . |
| 51-151859 | 12/1976 | Japan . |
| 52-30555 | 3/1977 | Japan . |
| 52-58377 | 4/1977 | Japan . |
| 52-62757 | 5/1977 | Japan . |
| 52-131564 | 10/1977 | Japan . |
| 34118 | 1/1913 | Sweden . |
| 895237 | 5/1962 | United Kingdom . |
| 922333 | 3/1963 | United Kingdom . |
| 959137 | 5/1964 | United Kingdom . |
| 985714 | 3/1965 | United Kingdom . |
| 1049239 | 11/1966 | United Kingdom . |
| 1087446 | 10/1967 | United Kingdom . |
| 1146241 | 3/1969 | United Kingdom . |
| 1161884 | 8/1969 | United Kingdom . |
| 1233238 | 5/1971 | United Kingdom . |
| 1238374 | 7/1971 | United Kingdom . |
| 1272818 | 5/1972 | United Kingdom . |
| 1376851 | 12/1974 | United Kingdom . |
| 1391228 | 4/1975 | United Kingdom . |
| 1418282 | 12/1975 | United Kingdom . |
| 1448595 | 9/1976 | United Kingdom . |

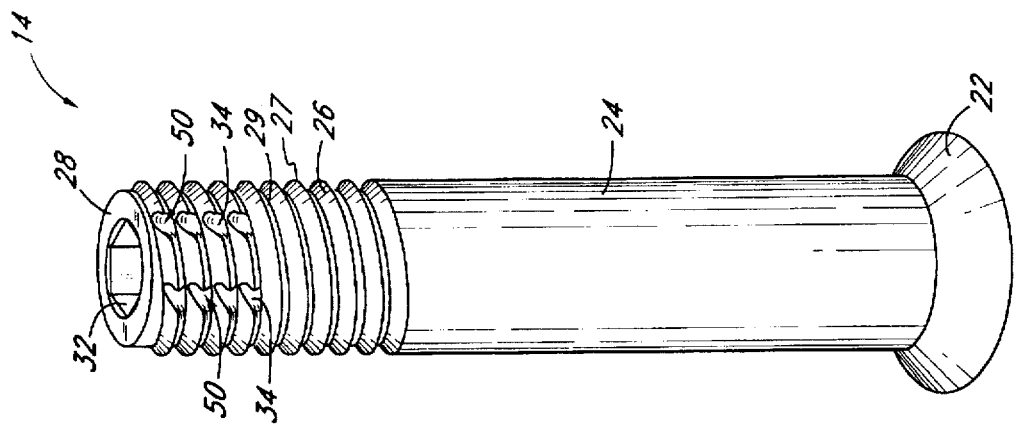
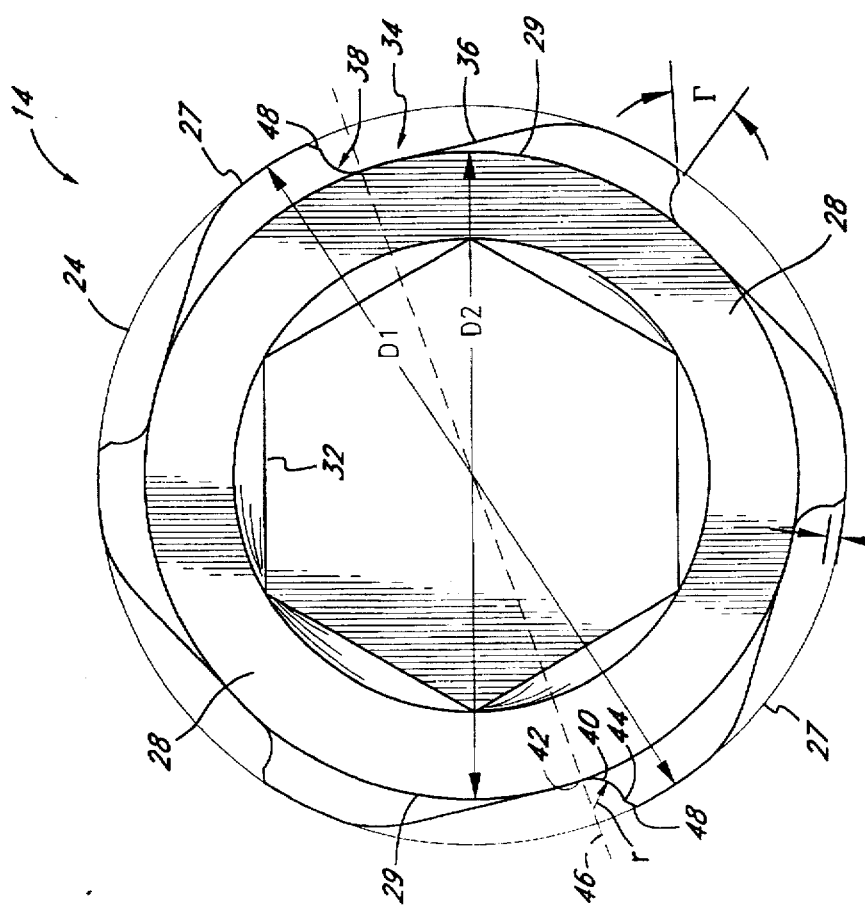

DEFORMABLE LOCKING FASTENER SYSTEM AND METHOD OF USE

RELATED CASE

The present application is a continuation-in-part of U.S. application Ser. No. 08/026,345, filed on Mar. 4, 1993 now U.S. Pat. No. 5,452,974. application Ser. No. 08/026,345 is hereby incorporated by reference.

BACKGROUND OF THE INVENTION

1. Field of the Invention

The present invention relates to fastener systems and, in particular, to locking fastener systems.

2. Description of Related Art

Various locking fastener systems have been developed to join together materials under a desired compressive force and to "lock" in place to prevent unintentional loosening primarily due to vibrational forces. Prior fastener systems commonly include a collar (i.e., a nut) which cooperates with a fastener (i.e., a bolt or a pin) to produce a predetermined preload on the materials joined by the fastener and the collar. That is, a tension force develops between the fastener and the collar as the collar is threaded onto the fastener, placing the intervening joint in compression. The collar subsequently locks onto the fastener by a variety of means.

Some prior locking fastener systems rely on swaging the collar onto the fastener to lock the components together. Examples of locking fastener systems which swage collar material into the fastener are disclosed in U.S. Pat. No. 4,383,353, issued to Stencel; and U.S. Pat. Nos. 4,601,623, 5,145,300, issued to Wallace.

These prior fastener systems, however, suffer from several drawbacks. Prior fastener systems which first generate a preload and subsequently swage collar material into the fastener tend to produce scattered preload values. That is, the designed preload value produced by a particular size of fastener can range widely between a minimum value and a maximum value. For instance, a ¼"-28 UNF titanium fastener system, of the type disclosed in U.S. Pat. No. 5,145,300, typically produces preload values ranging between 1500 lbs. and 3000 lbs. Such a wide range of preload values raises doubt concerning joint reliability. Design limits of the nut of U.S. Pat. No. 5,145,300 also make it insufficient to discourage a wide scatter of preload values because it does not have a feature to locate the tool to a specific location on the nut when it engages the nut.

Additionally, prior installation tools used with the prior locking fastener systems further exacerbate the scattering of preload values. Prior installation tools tend to prematurely disengage from the collar (i.e., "cam-off"). The forward end of the collar resists being deformed and finds relief in development of an axial force which causes the tool to wind off and disengage from the collar prematurely.

Scattered preload values also result from a technician's efforts to keep the installation tool on the collar (i.e., to compensate for the cam-off tendency) by applying end pressure to the installation tool which varies from one installation to another. And, although the massive end pressure exerted by the technician may prevent the installation tool from camming off, a corresponding exertion of equal effort may be required to disengage the installation tool after installation, further frustrating the installation process.

Prior installation tools also require about 360° of tool rotation about the collar, once the desired preload has been produced, in order to swage the collar onto the fastener. In confined working quarters, this degree of tool rotation is difficult, even using a ratcheting wrench.

Finally, prior installation tools and fastener systems tend to over-strain a flimsy hexagon key which engages a cooperative recess in the tail of the fastener and carries the reaction force during blind side installation. The hexagon key commonly breaks under excessive force and the fastener tail recess commonly erodes. Over straining results when the swaging operation commences while the collar is still capable of rotating under the applied torque.

SUMMARY OF THE INVENTION

The present fastener system includes a duplex collar, a fastener and an installation tool used to install the collar onto the fastener. The collar comprises a cylindrical forward portion, a central portion having an elliptical cross-sectional shape and an aligned rearward portion having a reduced elliptical cross-sectional shape. The installation tool includes cavities having shapes complementary to the shape of the duplex collar and fits over the collar during the installation process. Rotation of the installation tool applies a torque to the collar to thread the collar onto the fastener.

The present invention includes the recognition that previous tools, which engage and apply torque to the collar with smooth, arcuate or flat surfaces, produce a rotational force having a greater compressive force vector than a tangential force vector. Consequently, the applied torque elastically deforms (i.e., crushes) the collar inwardly into the threads of the fastener which increases the friction between the fastener and the collar. The increased friction typically causes the fastener to rotate with the collar, thereby over-stressing and breaking the hexagon key used to restrain the fastener in blind side fastening.

In addition, the elastic deformation of the collar typically produces artificial preload values which decrease after removing the installation tool from the collar. The increase in friction between the fastener and the collar requires more torque to install the fastener. However, when the installation tool is removed, the collar material springs back to regain some of its pre-deformed configuration and the preload value decreases.

The installation tool of the present invention minimizes the contact surface between the installation tool and the collar by applying a tangential force to the collar along driving ridges. The force applied along the driving ridges produces a significantly greater tangential force vector component than a radial force vector component, thus applying a greater driving force and a lesser crushing force than that applied by prior installation tools. Consequently, the present fastener system enhances the repeatability of preload values over the repeatability achieved by prior fastener systems. Additionally, less torque is applied to the fastener during installation, thus facilitating pneumatic drivers of lighter weight.

The paired driving ridges are advantageously spaced apart from each other by a distance proportional to a diametric distance between camming surfaces of the collar. As a result, rotation of the installation tool produces the desired preload value without a massive amount of torque and without over-stressing the threads of the collar and the fastener.

The concentration of the applied tangential force (i.e., the applied torque) along a ridge requires that the force be spread over a sufficient axial length to ensure that the collar does not deform enough to engage locking flutes on the fastener prior to applying the torque required to produce the desired preload value. Partial engagement of the installation tool socket would cause a reduction of preload because the socket would not contact the entire axial length of the collar driving surface. To encourage full engagement, the improved nut has a shoulder, a transition radius and a shallow radiused undercut at the ends of the major axis of the middle elliptical barrel portion of the nut. These features match the end configuration of the installation tool and discourage the tool from rupturing the nut surface or from scraping away nut surface protection coating. However, weight considerations limit the axial length of the collar. For use in the aeronautical and aerospace industries, the collar is desirably designed to be as lightweight as possible and still produce the desired amount of compression between the joined materials (i.e., produce the desired preload).

The present collar optimizes the collar's weight and axial height, providing sufficient contact surface to disperse the applied torque such that the collar resists compressive elastic deformation prior to applying the torque required to produce preload while having an acceptable weight. Moreover, the collar maximizes the tensile strength of the collar by maximizing the mass of the collar forward portion to improve its hoop strength. Consequently, the tensile load sustainable by the fastener system is increased over the fastener system of U.S. Pat. No. 4,601,623.

Through analytical and empirical analysis, it has been determined that a collar with the following axial lengths optimizes collar weight and strength: the overall length should be equivalent to a number of internal tread pitches of the collar, with the number within the range of about 9.5 to about 10.5; the middle elliptical barrel should have an axial length within the range of about 2.8 to about 3.25 internal thread pitches and the rearward elliptic barrel portion an axial length range of 3.4 to 3.75 internal thread pitches. The specific number of thread pitches will depend on the diameter size of the nut. The axial bore thread, however, desirably is a standard size thread, such as, for example, 36, 32, 28, 24 or 20 threads per inch.

Thus, in accordance with one aspect of the present invention, a deformable duplex collar, which is used with a fastener to join together materials under a desired preload, comprises an axial bore. The axial bore receives a portion of the fastener with at least a portion of the axial bore having a complimentary thread to engage a threaded portion of the fastener. A rearward portion of the collar has a generally elliptical cross-sectional shape. The rearward portion is sized to deform radially inward to lock together the collar and the fastener. The rearward portion has an axial length within the range of from about 3.4 P to about 3.7 P, where P equals a thread pitch of the axial bore thread. A central portion of the collar also has a generally elliptical cross-sectional shape which is larger than the rearward portion. The central portion is sized to support a higher torque than the swaging torque that will be exerted to deform the rearward portion. The central portion has an axial length within the range of from about 2.8 P to about 3.25 P.

Another aspect of the present invention involves a deformable duplex collar for use with a fastener to join together materials under a compressive load. The duplex collar comprises a central portion having an elliptical cross-sectional shape and an axial height. The axial height ranges from about 28 to about 32 percent of the total axial height of the duplex collar. A rearward collar portion is connected to the central portion. The rearward portion has an elliptical cross-sectional shape. An axial height of the rearward portion ranges from about 34 to about 37 percent of the total axial height of the duplex collar.

In accordance with an additional aspect of the present invention, a deformable duplex collar, which is used with a fastener to join together materials under a compressive load, comprises a central portion. The central portion has an elliptical cross-sectional shape with a major axis. A rearward collar portion is connected to the central portion and has an elliptical cross-sectional shape with a major axis. A generally cylindrical forward portion is connect to the central portion by a shoulder. The central portion includes a pair of undercut recesses that extend into the central portion at the ends of the major axis of the central portion. The undercut recesses are positioned directly adjacent the shoulder.

An additional aspect of the present invention involves a locking fastener system for coupling together materials under a desired preload. The fastener system comprises a fastener having a shank comprising a threaded portion. A collar of the fastener system defines an axial bore which receives a portion of the fastener shank. At least a portion of the axial bore includes a complimentary thread to engage the threaded portion of the fastener shank. The collar comprises a rearward portion having a generally elliptical cross-sectional shape and a central portion also having a generally elliptical shape. The rearward portion is sized to deform radially inward to lock together the collar and the fastener. The rearward portion has an axial length within the range of from about 3.4 P to about 3.75 P, where P equals a thread pitch of threads of the axial bore. The central portion is larger than the rearward portion and is sized to support a desired load which is larger than that required to deform the rearward portion. The central portion has an axial length within the range of from about 2.8 P to about 3.25 P.

In accordance with another aspect of the present invention, the present invention includes the recognition that prior fastener flute designs also contributed to over-stressing the hexagon key used in blind side installation. Flutes, with concave shapes intersecting the fastener thread periphery at shape points, tend to prematurely capture (i.e., "precapture") the collar which encourages the fastener to rotate with the collar before reaching the required preload. That is, as the collar is tightened and the applied torque rises, prior installation tools elastically crush the collar inwardly which interferes with the sharp intersection between the flute and the fastener thread periphery. As a result, the fastener is captivated prematurely and rotates with the collar, thereby over-stressing the hexagon key and causing it to fail.

The present fastener comprises flutes having convex bottom surfaces extending from leading shoulders which chase and blend with the fastener periphery (i.e., the crests of the fastener thread). Blending in the direction that the collar turns delays capturing the fastener, thereby allowing a higher preload to develop without over-stressing the hexagon key.

In accordance with an additional aspect of the present invention, the installation tool advantageously prevents camming off prematurely when swaging the collar. The installation tool comprises oblique driving ridges which produce an axial force thrusting the installation tool onto the collar when generating the desired preload. One design of the installation tool additionally includes oblique swaging ridges which prevent the installation tool from camming off from the collar when swaging the collar into the fastener flutes. Once the installation tool has completely swaged the collar, the installation tool spins off from the collar when encouraged by the technician.

Additionally, the present invention also includes a preferred method of installing a deformable fastener system. The method includes the steps of engaging a first pair of driving ridges of the installation tool with the collar central portion, and engaging a second pair of driving ridges with the collar rearward portion. The installation tool is then rotated, threading the collar onto the fastener and compressing the intervening materials. Further rotation of the installation tool at a desired torque circumferentially displaces portions of the collar central barrel and portions of the collar rearward barrel. Swaging ridges, of the installation tool then engage the collar rearward portion and are rotated to deform the rearward portion inwardly into the fastener flutes, thereby locking the collar to the fastener.

BRIEF DESCRIPTION ON THE DRAWINGS

These and other features of the invention will now be described with reference to the drawings of a preferred embodiment, which is intended to illustrate and not to limit the invention, and in which:

FIG. 1 is a sectional view illustrating a locking fastener system and an installation tool of the present invention;

FIG. 2 a perspective side view of a fastener of the locking fastener system of FIG. 1;

FIG. 2a is a top plan view of the fastener of FIG. 2;

Figure 1:
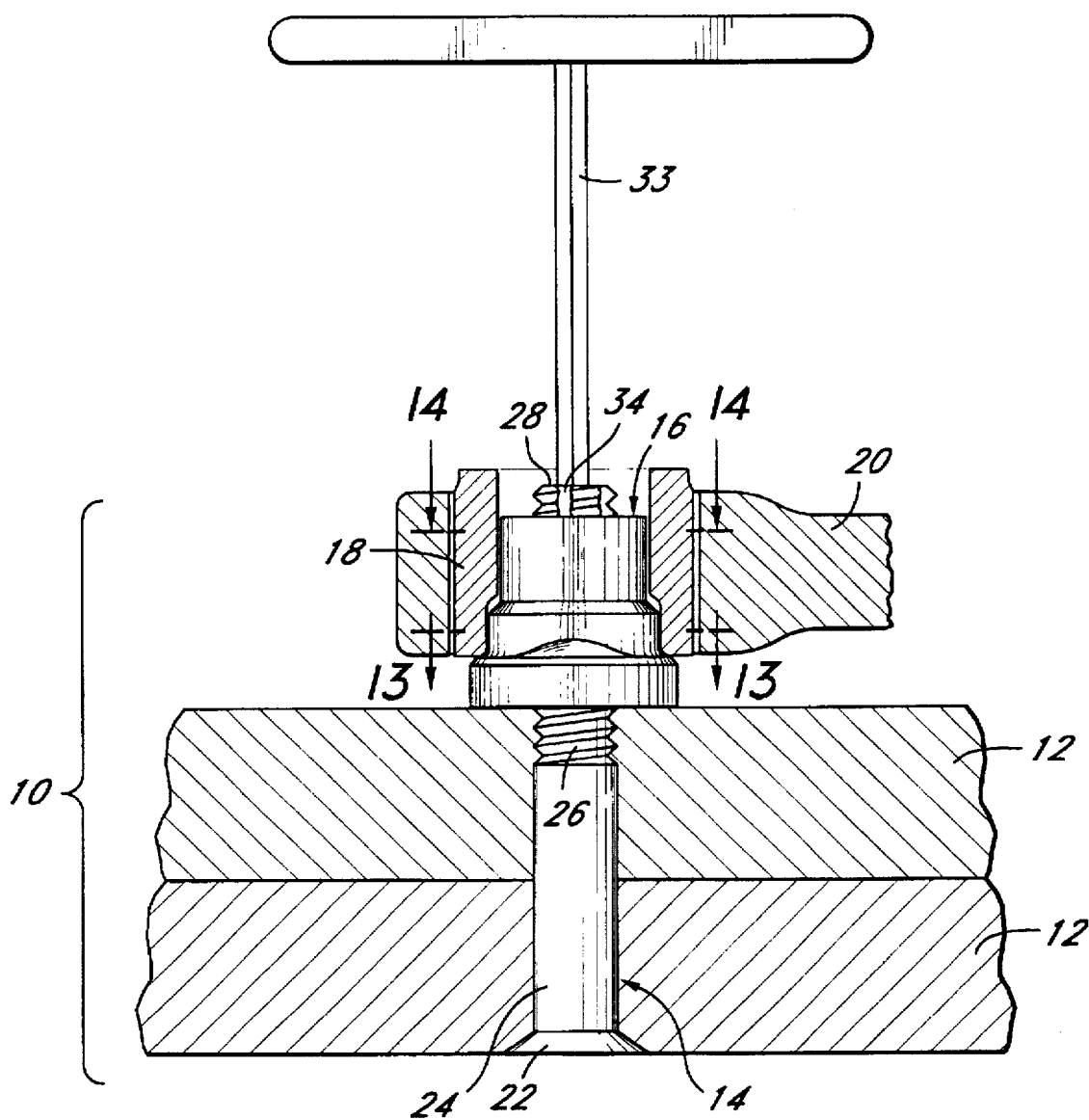
Figure 13:
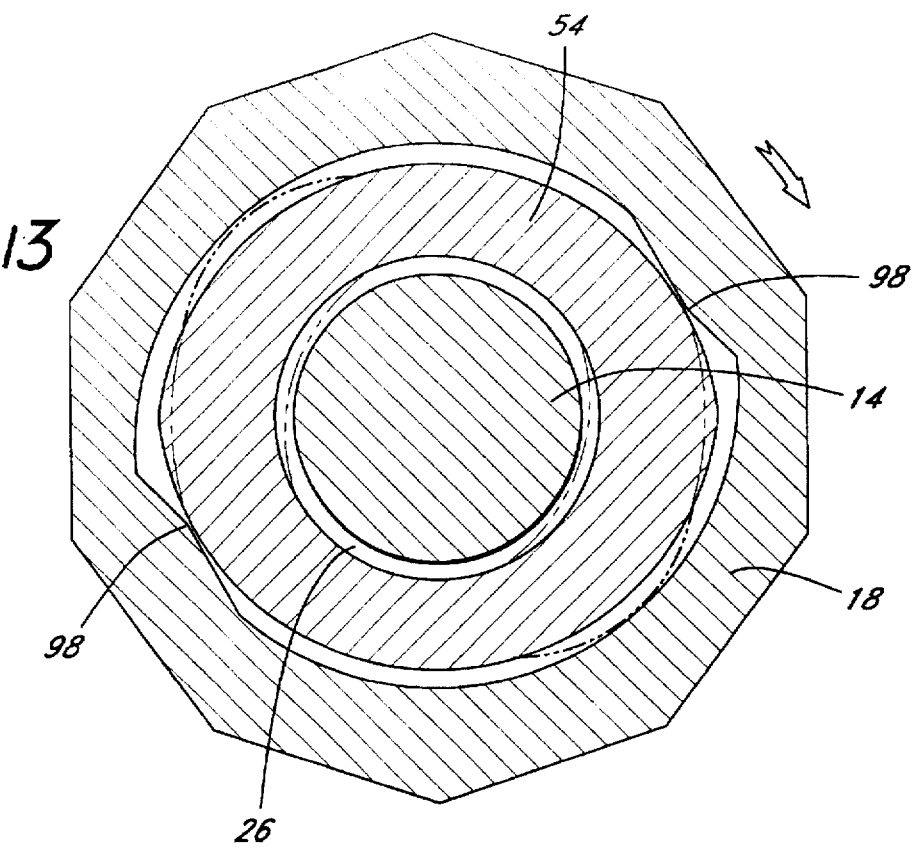
Figure 14:
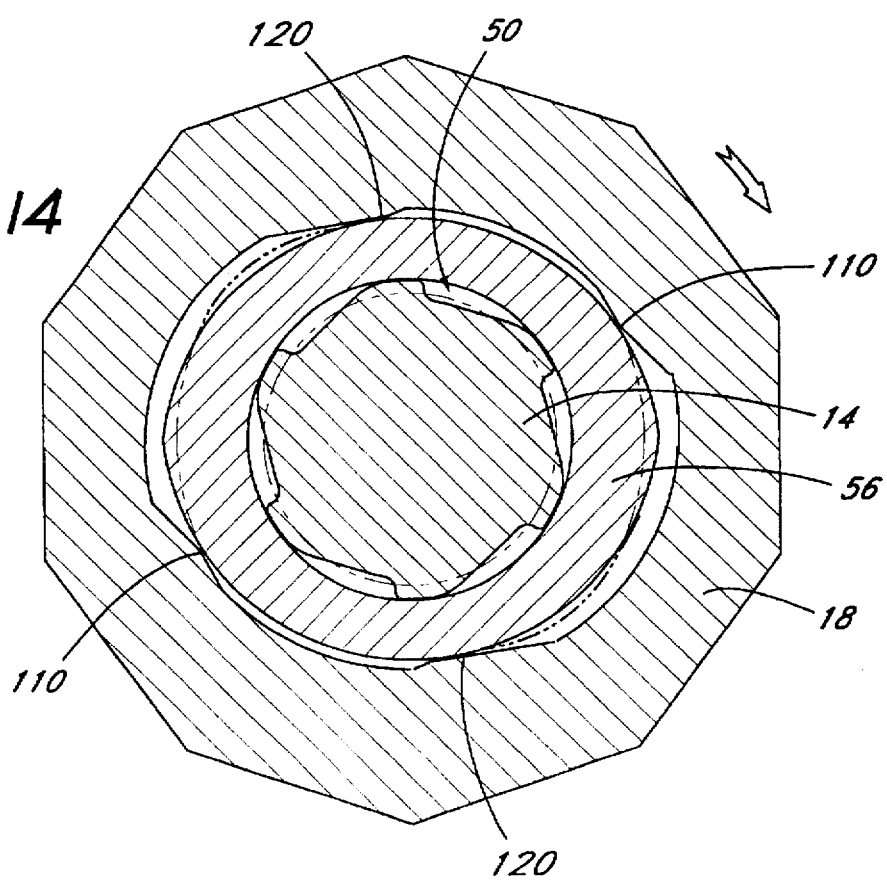

FIG. 13 is a cross-sectional view of the fastener system and installation tool taken along line 13—13 of FIG. 1, illustrating in phantom line the configuration of the collar central portion after plastic deformation; and FIG. 14 is a cross-sectional view of the fastener system and installation tool taken along line 14—14 of FIG. 1, illustrating in phantom line the configuration of the collar rearward portion after plastic deformation.

DETAILED DESCRIPTION OF A PREFERRED EMBODIMENT

FIG. 1 illustrates in partial cross section a locking fastener system 10 in accordance with an embodiment of the present invention. The fastener system 10 advantageously is used to join together materials 12, to generate a desired compressive force between the joined materials 12 (i.e., "to generate a desired preload force") and to lock in place to prevent substantial degradation of the compressive force (i.e., preload) due to vibrational forces.

The fastener system 10 comprises a threaded fastener 14, such as a bolt or a pin, and a deformable duplex collar 16 which locks onto the fastener 14 once the desired preload force has been generated. As installed, as shown in FIG. 1, the fastener 14 passes through the materials 12 from one side and the collar 16 threads onto the fastener 14 from the other side. An installation tool 18, coupled to a wrench 20, is used to rotate and to tighten the collar 16 onto the fastener 14. The individual components of the locking fastener system 10 will now be described in detail.

The Fastener

As illustrated in FIG. 2, the fastener 14 comprises a head 22 and an elongated shank 24 having an externally threaded portion 26 which engages the collar 16. The threaded portion 26 comprises a standard thread forming a helical series of crests 27 and roots 29 uniformly spaced apart. As illustrated in FIG. 2a, the threaded portion 26 has a major diameter $D_1$ defined between the thread crests 27 and has a minor diameter $D_2$ defined between the thread roots 29.

The fastener 14 can have a variety of lengths and diameters according to the particular application of the fastener system 10. For instance, the fastener 14 can accommodate grip thicknesses from 0.40 to 3.0 inches and can range in diameter from 0.156 to 0.375 inch or greater.

Referring to FIGS. 2 and 2a, a rear end 28 of the fastener 14 defines a polygonal-shaped cavity 32 extending into the fastener 14 in the longitudinal direction which receives a wrenching key 33 during installation. As used herein, "in the longitudinal direction" means in a direction parallel to the longitudinal axis of the fastener 14 (which is also generally parallel to the longitudinal axis of the collar 16). In addition, "in the radial direction" means in a direction radiating from the longitudinal axis.

The fastener threaded portion 26 defines a plurality of recesses 34 positioned proximate to the fastener end 28. With reference to FIG. 2a, each recess 34 comprises a convex bottom surface 36 extending from a shoulder 38. Although FIG. 2a illustrates the bottom surface 36 as being an arcuate convex surface, it is understood that the bottom surface 36 could comprise a plurality of straight segments connected in such a way as to allow the line defining the bottom surface 36 to chase and blend with the thread crest 27.

The shoulder 38 has an arcuate surface 40 defined by a radius r and extends between a first point 42 and a second point 44. The first point 42 is located along a diameter line 46 of the shank 24, proximate to the thread root 29. Thus, the recess 34 has a depth, measured in the radial direction from the thread crest 27 towards the fastener longitudinal axis, slightly less than the depth of the thread root 29 (i.e., slightly less than $D_1-D_2/2$).

The shoulder 38 also includes a chamfer 48 extending outwardly (i.e., away from the longitudinal axis) from the second point 44 at an angle Γ oblique to the diameter line 46. The angle Γ formed between the chamfer 48 and the diameter line 46 ranges between 15° and 45°, and desirably equals 30°. The curved surface 40 and chamfer 48 forming the shoulder 38 generally prevent a roll-over burr from forming at the transition of the shoulder 38 and the thread crest 27 when forming the recess 34.

The convex bottom surface 36 extends from the first region adjoining point 42, chasing and blending with the periphery of the thread crest 27. That is, the convex bottom surface 36 tapers radially outwardly from the first point 42 to the thread crest 27 and smoothly blends into the thread 26. Although FIGS. 2 and 2a illustrate the convex bottom surface 36 of the recess 34 as chasing and blending with the periphery of the thread crest 27 in the clockwise direction, it is understood that the convex bottom surface 36 can extend in the counter-clockwise direction, where the collar 16 threads onto the fastener 14 in the counter-clockwise direction.

As illustrated in FIG. 2, the recesses 34 form a plurality of axial flutes 50 which extend across several thread crests 27 and generally lie parallel to the longitudinal axis of the fastener 14. During the installation process, the flutes 50 receive collar material which is swaged into the flutes 50 to lock the collar 16 onto the fastener 14, as discussed below.

The fastener 14 desirably includes six flutes 50 equally spaced around the circumference of the shank 24. The fastener 14, however, can include any number of flutes 50; however, it is preferred that the fastener 14 include an even number of flutes less within the range of 4 to 8.

The Duplex Collar

Figure 3:
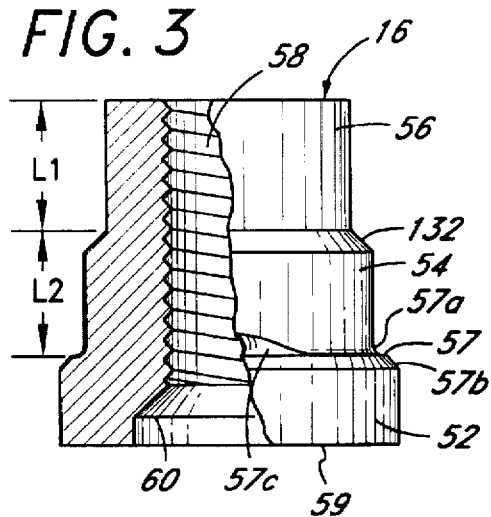
FIGS. 3 is a partial cut-away front elevational view of a duplex collar of the locking fastener system of FIG. 1.
Figure 3A:
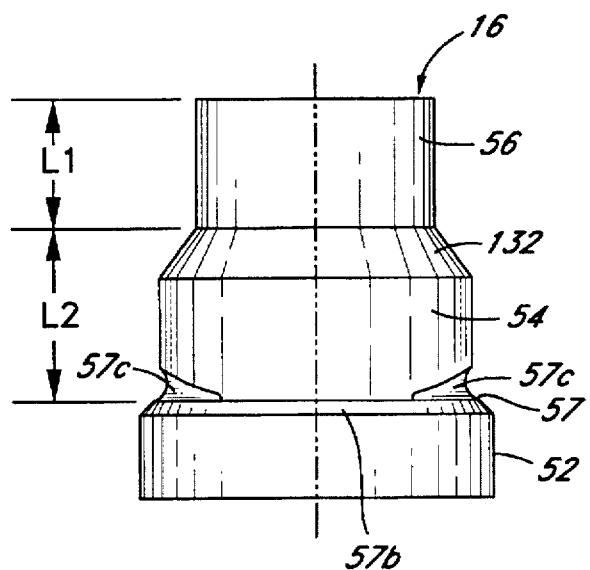
FIG. 3a is a side elevational view of the duplex collar of FIG. 3.

With reference to FIG. 3, the duplex collar 16 has a forward base 52, a deformable central portion 54 and a deformable rearward portion 56. As used herein, "rearward" and "forward" are used to indicate the proximity of the joined materials 12 when installed. That is, the forward base 52 is closer to the joined materials 12 than the rearward portion 56 when installed. The duplex collar 16 has a stepped configuration decreasing in size from the forward base 52 to the central portion 54 to the rearward portion 56, the central portion 54 integrally joining together the forward base 52 and rearward portion 56.

The collar 16 defines a threaded central axial bore 58 which receives the fastener threaded portion 26. The collar 16 also defines a counterbore 60 extending into the forward base 52 from a forward end 59 of the collar 16 to accommodate a 1/16th inch variation of work sheet thickness in which case a portion of the fastener shank 24 would insert into the counterbore 60.

The forward base 52 has a cylindrical shape with a complex shoulder 57 and a rounded fillet 57a to blend with the elliptical shape of the central portion 54. The step which the shoulder 57 provides at the minor axis of the central elliptic barrel 54 of the nut incorporates material that increases hoop strength and desirably raises nut tension value. The shoulder 57 and blending radiused fillet 57a are abrupt enough to match and to provide a positive stop location for the forward end of the installation tool 18.

A tapering surface 57b is circularly uniform around the nut forward portion 52 but erases the shoulder 57 approximate to the elliptic ends of the nut central barrel portion 54 at the ends of the major diameter. In the illustrated embodiment, to restore the shoulder 57 and to give it circularity, the cam ends of the elliptical barrel 54 are undercut with a shallow radius recess 57c that blends with the fillet 57a. Thus the tool 18 consequently has a precut shoulder around the cam end of the elliptical nut barrel portion 54 so as to guide it as it displaces material from the cam ends of elliptical nut barrel portion 54, as discussed below. The collar 16, however, can be formed without the undercut recesses 57c. It is contemplated that the undercut recesses 57c can be used to account for variations in material hardness. The undercut recesses 57c can be used with harder collar material to bring the produced preload values into specification.

Figure 4:
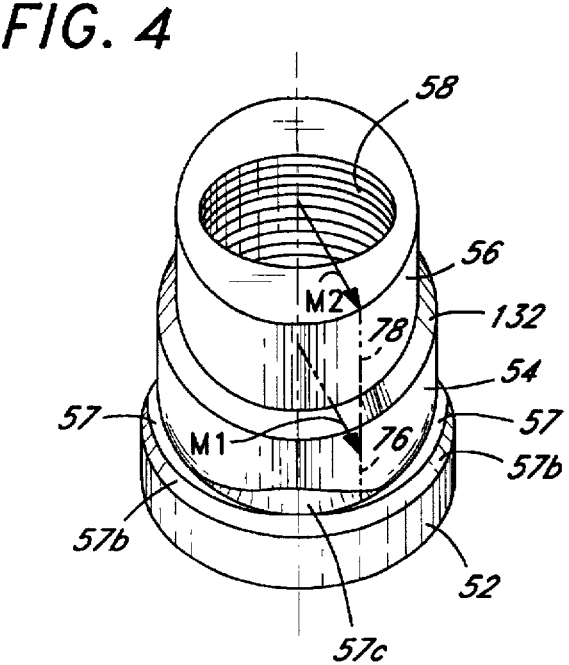
FIG. 4 is a top perspective view of the duplex collar of FIG. 3.
Figure 5:
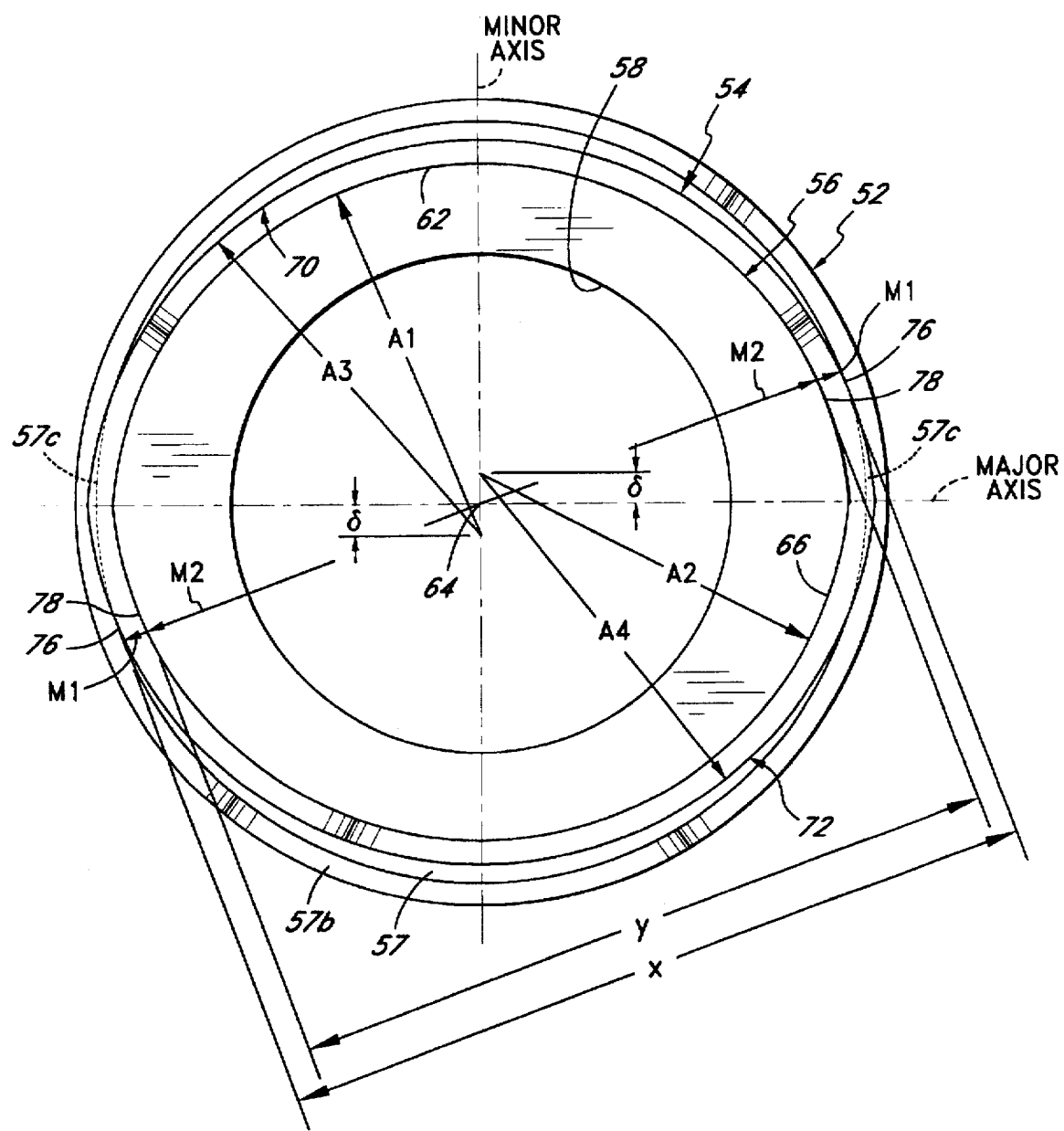
FIG. 5 is a top plan view of the duplex collar of FIG. 3.

As illustrated in FIGS. 4 and 5, the central portion 54 and the rearward portion 56 have generally elliptical shapes in cross section. As used herein, "elliptical" and "ellipse" are not used in strict definitional senses, but instead are used to describe a generally smooth, continuous, out-of-round shape which deviates in shape in a cam-like fashion from a region of minimum radial dimension to a region of maximum radial dimension.

For example, FIG. 5 illustrates a top plan view of a preferred embodiment of the duplex collar 16. The rearward portion 56 is defined by two peripheral arcuate surfaces: a first peripheral surface 62 defined by a radius $A_1$ offset from a center 64 of the collar 16 by a distance δ; and a second peripheral surface 66 defined by a radius $A_2$ offset from the collar center 64 by an equal distance δ, but on the opposite side of the collar center 64 along a minor axis of the rearward portion 56. The radii $A_1$, $A_2$ have equal lengths. Likewise, the central portion 54 is defined between two peripheral arcuate surfaces. A first peripheral surface 70 is defined by a radius $A_3$ and a second peripheral surface 72 is defined by a radius $A_4$. Each radius $A_3$, $A_4$ is offset from the center 64 of the collar 16 by a distance δ, but on opposites sides of the center 64 along a minor axis of the central portion 54. The radii $A_3$, $A_4$ also have equal lengths.

The central portion 54 is sized with respect to the rearward portion 56 to produce a desired preload before locking the collar 16 onto the fastener 14. As will be explained in greater detail below and as illustrated in FIG. 4, a moment arm $M_1$ at a camming surface 76 of the central portion 54 is selected to carry the majority of the applied torque up until a desired preload is produced. The central portion may carry up to two-thirds of the torque required to produce the desired preload. A moment arm $M_2$ at a camming surface 78 of the rearward portion 56 is selected to carry the balance of the applied torque up to preload. The moment arm $M_2$ is also selected such that the rearward portion 56 plastically deforms at a torque less than the total torque required to produce the desired preload, but greater than the torque carried by the rearward portion 56 up until the desired preload is reached. The collar rearward portion 56 plastically deforms at a torque between these values, with the tool 18 swaging the material of the rearward portion 56 radially inward and into the flutes 50 of the fastener 14. Advantageously, the ratio of the major axis of the rearward portion 56 to the minor axis of the central portion 54 ranges from about 1.0 to about 1.2 to provide the desired moment arm lengths. In a preferred embodiment, the ratio equals 1.0.

The ratio of the minor axis to the major axis for both the central portion 54 and the rearward portion 56 ranges from about 0.83 to 0.93, and desirably equals 0.88. In other words, the eccentricity θ of the elliptical shapes for the central portion 54 and the rearward portion 56 advantageously ranges between 39.75° and 43.75°, and desirably equals about 41.75°, where the degree of eccentricity θ equals the arc-tangent of the minor diameter divided by the major diameter. If the degree of eccentricity θ of the elliptical shapes is much greater (i.e., the elliptical shape is "flatter"), too great of a moment arm exists and the applied torque may strip the threads of the collar 16 and the fastener 14. Conversely, if the degree of eccentricity of the elliptical shapes is much less (i.e., the elliptical shape is "more round"), an insufficient torque will be developed.

The axial lengths for the central portion 54 and the rearward portion 56 are also designed to generate the desired preload before plastically deforming the collar 16. That is, the axial length of the rearward portion 56 and the central portion 54 are selected to provide sufficient contact surface between the collar 16 and the installation tool 18 to disperse the applied torque such that collar 16 resists plastic deformation prior to applying the torque required to produce preload. The total axial height of the collar 16 also must be sufficient to support enough threads such that the desired preload is less than the tensile strength of the fastener system 10. Desirably, the preload value should be less than 75% of the tensile strength of the fastener system 10 for safety. The collar 16, however, should be as lightweight as possible.

To provide an example of the optimum relation of axial lengths of the collar barrel portions for a ¼"-28 UNF nut, the combined axial length of the collar is 9.5 P (0.339 inch), the axial length of the forward portion is 3.0 P (0.107 inch), the axial length and the central portion 54 is 3.0 P (0.107 inch) and the axial length of the rearward portion 56 is 3.5 P (0.125 inch), where "P" designates the axial pitch length measured between matching points on adjacent thread forms on the same side of the longitudinal axis. Therefore, as illustrated in FIG. 3, the rearward portion 56 has an axial length $L_1$ of approximately 37% of the total axial length of the collar 16. The central portion 54 has an axial length $L_2$ of approximately 31.5% of the total axial length of the collar 16 and the forward portion has an axial length of approximately 31.5% of the total axial length of the collar 16.

Referring to FIG. 5, the areas of the rearward portion 56 and of the axial bore 58 measured in a plane perpendicular to the collar longitudinal axis are selected to produce sufficient swaging of the rearward portion material to lock the collar 16 onto the fastener 14. The ratio between the total cross-sectional area of the rearward portion 56 and the area of the axial bore 58 ranges between 1.9 and 2.3, and desirably equals 2.1.

Another exemplary embodiment of the collar 16 includes a ⅜"-24 UNF threaded axial bore 58. The rearward portion 56 has an axial length of 0.167 inch, a major diameter of 0.536 inch and a minor diameter of 0.478 inch. The central portion 54 has an axial length of 0.143 inch, a major diameter of 0.594 inch and a minor diameter of 0.536 inch. The forward base has an axial length of 0.161 inch and a diameter equal to 0.640 inch. A fastener system 10 using a collar 16 dimensioned accordingly and made of titanium, and being installed with the installation tool 18 described below, would obtain a preload of about 8700 lbs minimum. Thus, it should be understood that one skilled in the art could construct a collar 16 with the appropriate dimensions for the desired preload.

The collar 16 and fastener 14 are advantageously constructed of a lightweight, high strength metal alloy, such as, for example, an aluminum or a titanium alloy. However, it is contemplated that the collar 16 and fastener 14 could be constructed of other materials with an appropriate strength and deformability tailored to the particular application for the fastener system 10.

The collar 16 is preferably formed from a single piece of material by forging, "heading" or like processes, as known in the art. The fastener 14 can be fabricated by known processes, such as, for example, forging a fastener blank, and cold rolling the threads 26 onto the fluted tail 50 of the blank.

The Installation Tool

Figure 6:
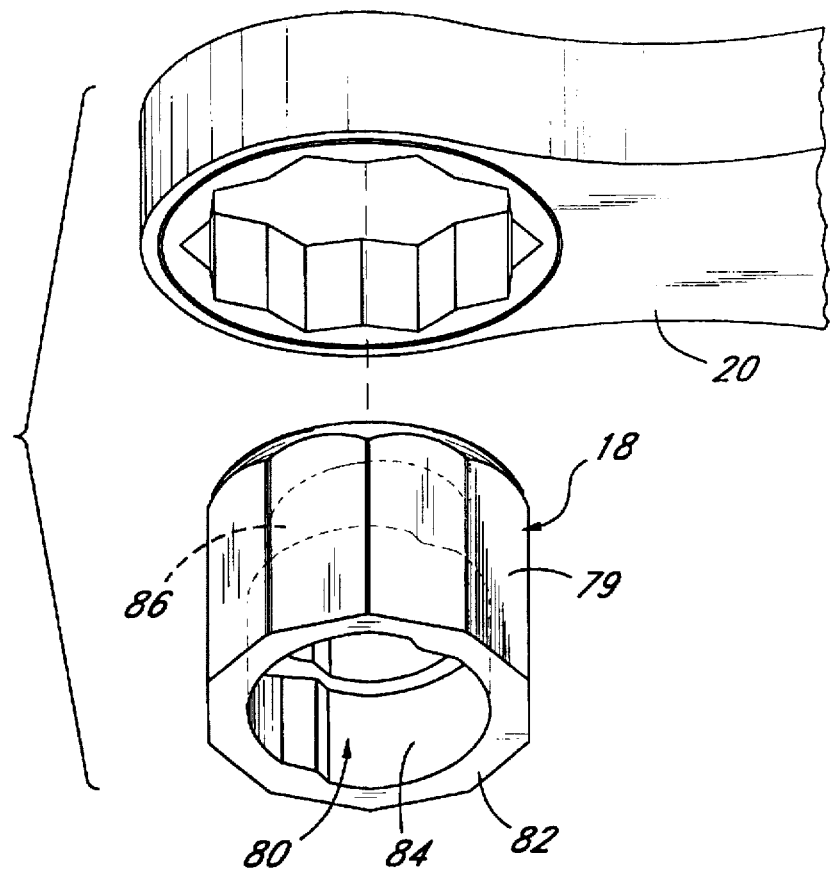
FIG. 6 is an exploded perspective view of the installation tool and wrench of FIG. 1.
Figure 6A:
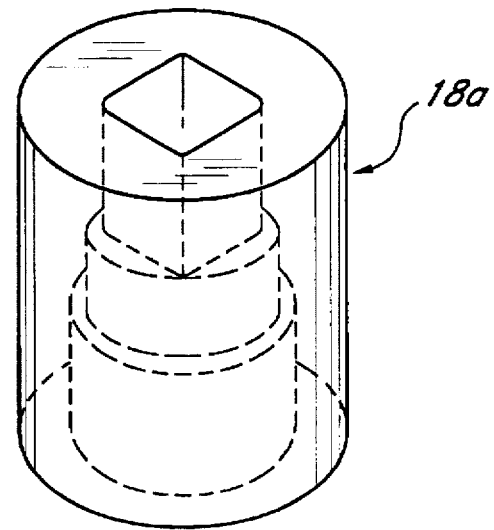
FIG. 6a is another embodiment of the installation tool of the present invention.

With reference to FIG. 6, the installation tool 18 has a polygonal-shaped exterior 79 which engages a correspondingly shaped cavity of the box wrench 20. Although FIG. 6 illustrates the installation tool 18 as an insert for a standard ratcheting box wrench 20, it is understood that an installation tool 18a can be formed as a standard socket for a socket driver wrench, as illustrated in FIG. 6a.

As illustrated in FIG. 6, the installation tool 18 defines a stepped axial bore 80 extending through the installation tool 18 in a longitudinal direction. The installation tool 18 defines a large cavity 84 which opens into a small cavity 86 in the rearward direction. The inner surfaces of the tool 18 desirably are smooth and without burrs. Smoothness of mating tool 18 and absence of sharpness are important to prevent the tool from galling the nut surface or from scraping away any surface protection coating which imparts corrosion resistance property to the nut material.

Figure 8:
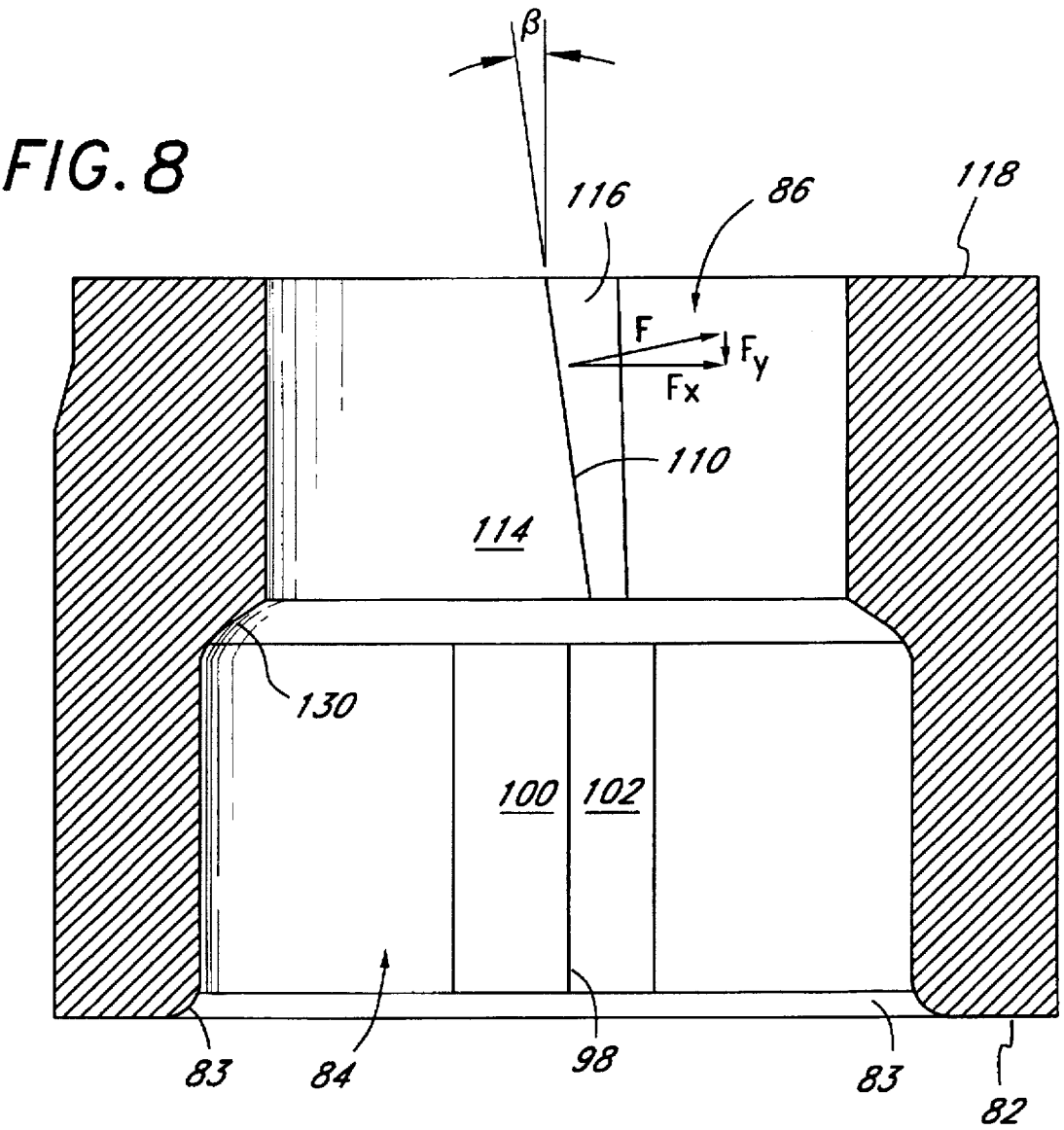
FIG. 8 is a sectional view of the installation tool taken along line 8—8 of FIG. 7.

The large cavity 84 extends from a forward end 82 into the installation tool 18. As best seen in FIG. 8, the installation tool 18 also includes a rounded transition section 83 disposed between the large cavity 84 and the forward end 82 of the installation tool 18 thereby forming a curved transition between the forward end 82 and the large cavity 84. The rounded transition section 83 has a radius of curvature which substantially matches the fillet 57a of the collar shoulder 57. During the installation process, the transition section 83 mates with the fillet 57a of the collar 16 with the forward end 82 of the installation tool 18 registering on the collar base shoulder 57, as discussed below.

Figure 7:
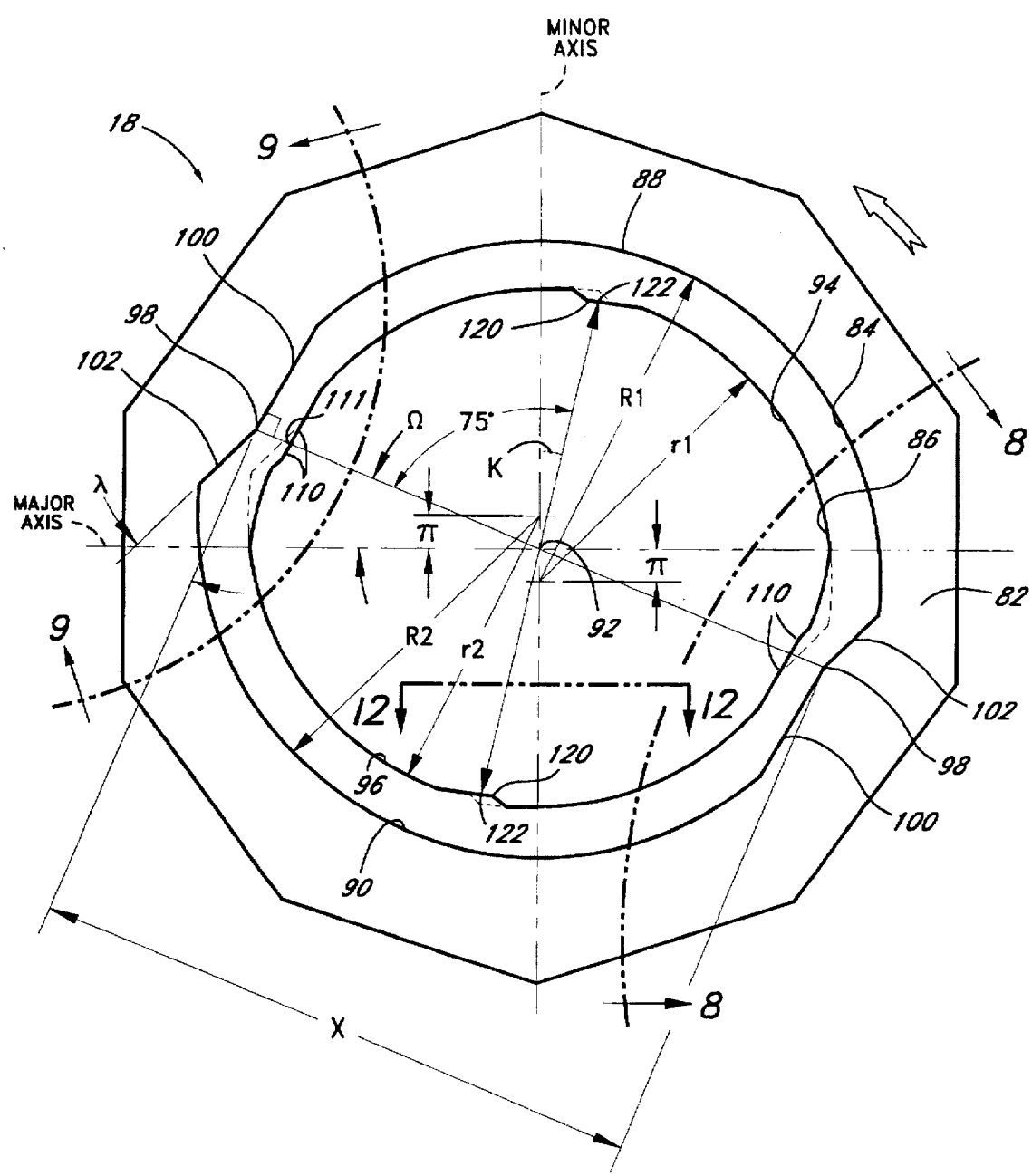
FIG. 7 is a bottom plan view of the installation tool of FIG. 6.

The large cavity 84 and the small cavity 86 are configured to engage the camming surfaces 76, 78 of the collar central portion 54 and rearward portion 56, respectively. As illustrated in FIG. 7, the large cavity 84 has a shape complimentary to that of the central portion 54, and desirably has a generally elliptical shape in plan view. The small cavity 86 similarly has a generally elliptical shape complimentary to the shape of the collar rearward portion 56. The installation tool cavities 84, 86 are slightly larger than the corresponding collar portions 54, 56 to facilitate placement of the installation tool 18 over the collar 16. For instance, the minor diameter of the small cavity 86 is dimensioned so that a pair of ridges, limited by parallel flats, can be a recognizable internal feature of the tool socket with the distance between the flats being about 0.005 inches greater than the minor diameter of the small barrel 56 of the collar 16. The large cavity 84 advantageously is sufficiently larger than the collar central portion 54 such that the installation tool 18 is easily placed over the collar 16.

Desirably, the major axes of the large cavity 84 and the small cavity 86 are generally aligned. Likewise, the minor axes of the cavities 84, 86 are generally aligned.

As seen in FIG. 7, the large cavity 84 is defined between a first arcuate surface 88 and a second arcuate surface 90. The first surface 88 has a radius of curvature $R_1$ slightly larger than the radius of curvature $A_3$ of the collar central portion 54 (FIG. 5). Likewise, the second surface 90 has a radius of curvature $R_2$ slightly larger than the radius of curvature $A_4$ of the collar central portion 54. Each radius $R_1$, $R_2$ is offset from a center 92 of the installation tool 18 by a distance π, but on opposite sides of the center 92 along the minor axis of the large cavity 84.

Similarly, the small cavity 86 is defined between a first arcuate wrenching surface 94 and a second arcuate wrenching surface 96. The first wrenching surface 94 has a radius of curvature $r_1$ slightly larger than the radius of curvature $A_1$ of the collar rearward portion 56 (see FIG. 5). Likewise, the second wrenching surface 96 has a radius of curvature $r_2$ slightly larger than the radius of curvature $A_2$ of the collar rearward portion 56. Each radius $r_1$, $r_2$ is off-set from the installation tool center 92 by a distance π, but on opposite sides of the center 92 along the minor axis of the small cavity 86. In a preferred embodiment, the distance π is slightly greater than the collar distance δ (FIG. 5).

As best seen in FIG. 7, a pair of driving ridges 98 interrupt the generally elliptical shape of the large cavity 84. That is, the driving ridges 98 are disposed diametrically opposite each other on the arcuate surfaces 88, 90 of the large cavity 84. As illustrated in FIG. 8, each driving ridge 98 generally extends along the entire axial height of the large cavity 84 and is generally parallel to the longitudinal axis of the installation tool 18.

With reference to FIGS. 7 and 8, an intersection of a flat plane 100 and a relief plane 102 forms each driving ridge 98. Both planes 100, 102 extend in the longitudinal direction parallel to the longitudinal axis of the installation tool 18. As understood from FIG. 7, the flat planes 100 lie generally along a chord of the arc defined by the arcuate surface radius $R_1$, $R_2$, with their limiting ridges so aligned that a line connecting them passes through the center point 92 (FIG. 7). The relief plane 102 truncates the flat plane 100 and angles outwardly from the flat plane 100 by an angle λ. The angle λ, which is about 15°, is desirably radiused to avoid sharpness. The line of intersection formed between the intersection of the flat plane 100 and the relief plane 102 defines the driving ridge 98 which contacts the collar central portion 54 during installation.

The point of intersection between the flat plane 100 and the relief plane 102 (i.e., the driving ridge 98) is off-set from the major axis of the large cavity 84 by an angle Ω which advantageously ranges between 25° and 35°, and desirably equals about 30°. The distance X between the driving ridges 98 is less than the major diameter of the collar central portion 54 and is greater than the minor diameter of the central portion 54. The distance X between the driving ridges 98 desirably equals a diametric distance across the collar central portion 54 at a point off-set from the central portion major axis by approximately 20° to 30°, and preferably at a point off-set by about 26°. That is, the ridge pair 98 should make line contact with the collar surfaces 70, 72 at an angle of about 25° from their major axis.

The driving ridges 98 advantageously engage the collar 16 proximate to the major axis of the collar central portion 54 to increase leverage. If angle Ω is too small, insufficient torque will be generated by the time the driving ridges 98 slip around the ends of the major axis of the collar 16 during the installation process. Conversely, if angle Ω is too large, too much torque will be generated which may over-stress the threads of the collar axial bore 58.

Figure 9:
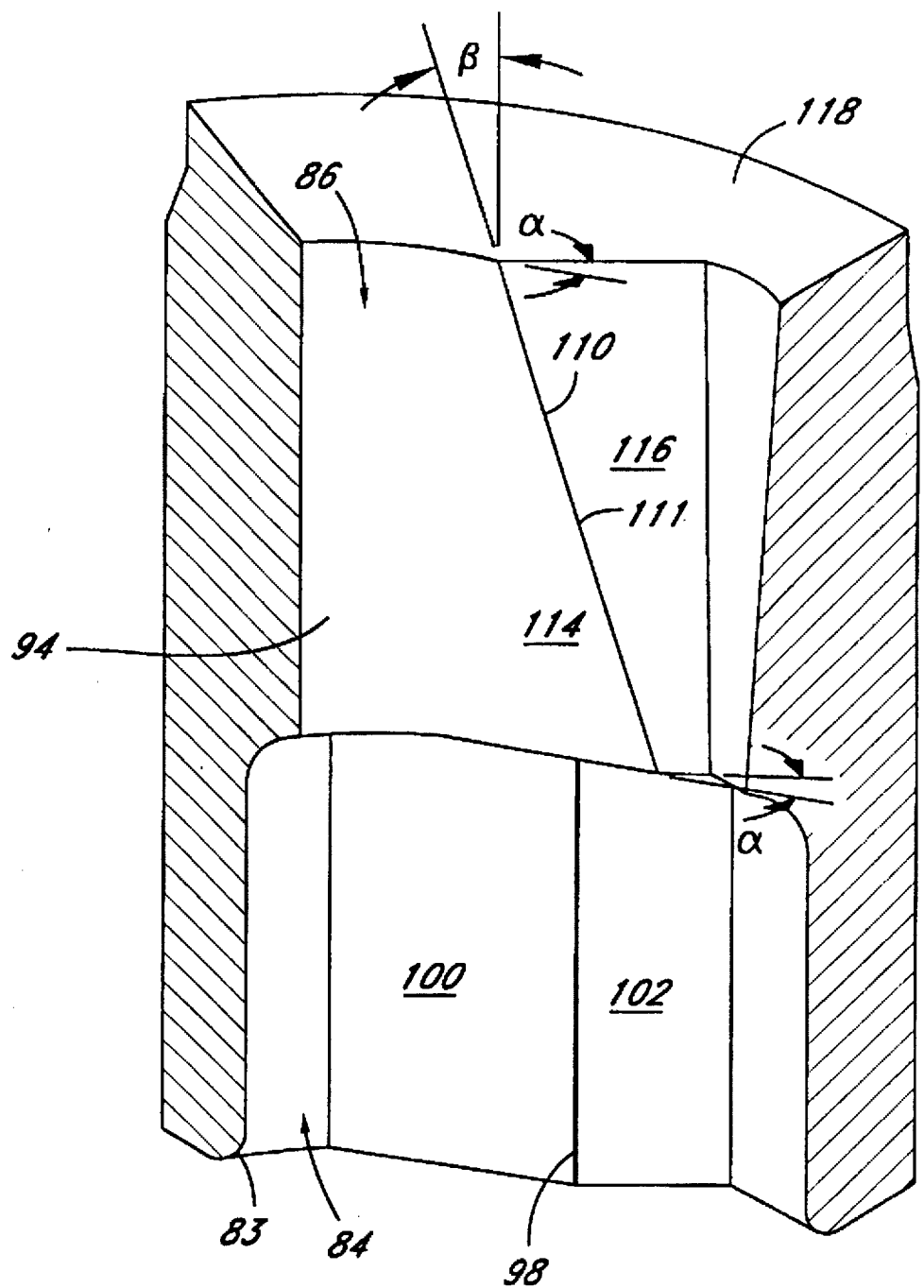
FIG. 9 is a perspective sectional view of the installation tool taken along line 9—9 of FIG. 7.
Figure 10:
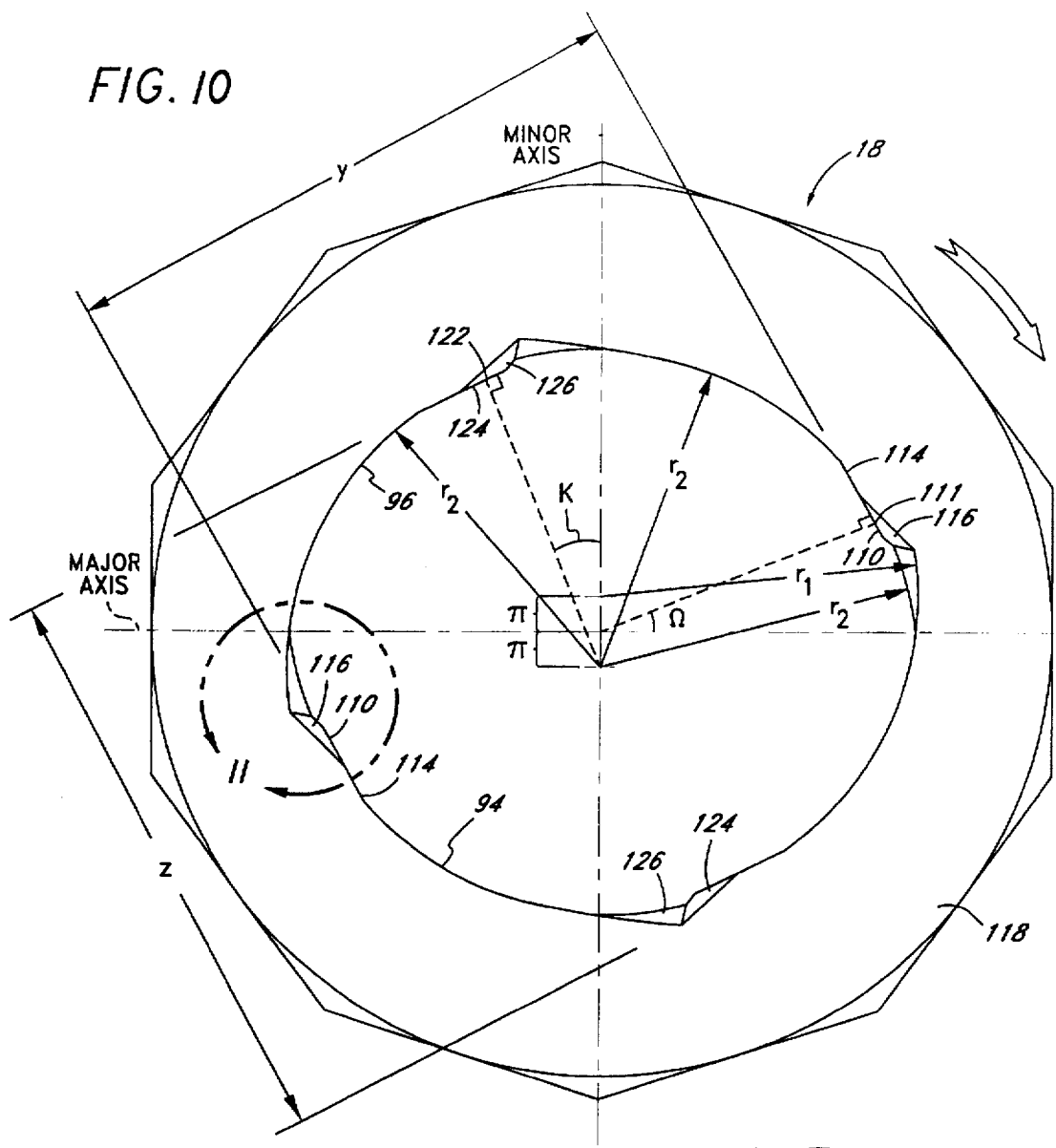
FIG. 10 is a top plan view of the installation tool of FIG. 6.

With reference to FIGS. 8, 9 and 10, the small cavity 86 includes a pair of oblique driving ridges 110. The oblique driving ridges 110 hold the installation tool 18 on the collar 16 and prevent the installation tool 18 from prematurely camming-off from the collar 16 during installation, as is discussed in greater detail below.

The oblique driving ridges 110 are disposed diametrically opposite each other on the interior wall of the small cavity 86. As illustrated in FIG. 8, each oblique driving ridge 110 extends along the entire axial height of the small cavity 86 and is skewed at an angled β from the longitudinal axis of the installation tool 18.

With reference to FIGS. 7 and 10, each oblique driving ridge 110 has a mid-point 111 which lies at a point bisecting the oblique driving ridge 110. As illustrated in FIG. 7, the mid-point 111 is located along a line extending between the driving ridge 98 of the large cavity 84 and the installation tool center 92. Thus, the mid-point 111 is off-set from the major axis of the small cavity 86 by the angle Ω.

As illustrated in FIG. 10, the distance Y between the mid-points 111 of the oblique driving ridges 110 is less that the major diameter of the collar rearward portion 56 and is greater that the minor diameter of the rearward portion 56. The distance Y between the oblique driving ridges 110 advantageously equals the diametric dimension across the collar rearward portion 56 at a point off-set from the major axis of the collar rearward portion 56 by approximately 15° to 30°, and desirably at a point off-set from the major axis of the rearward portion 36 by about 24°. That is, the center of the oblique ridge pair 110 should make point contact with the collar surfaces 56, 66 at an angle of about 25° from their major axis.

As best illustrated in FIG. 9, an intersection of a flat plane 114 and an oblique relief plane 116 forms each oblique driving ridge 110. The flat plane 114 lies generally parallel to the longitudinal axis of the installation tool 18 and, as best seen in FIG. 10, lies generally along a chord of the arc defined by the wrenching surface radius $R_3$, $R_4$.

Figure 11:
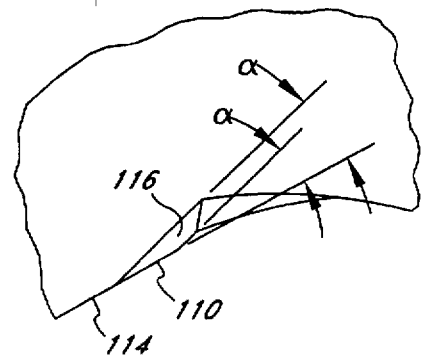
FIG. 11 is an enlarged partial top plan view of the area within line 11—11 of FIG. 10.

The oblique relief plane 116 truncates the flat plane 114 and angles outwardly from the flat plane 114 by an angle α (FIGS. 9 and 11) which approximately equals 12°. Desirably, the intersection is radiused for smoothness. In addition, as best illustrated in FIGS. 8 and 9, the oblique plane 116 is skewed with respect to the longitudinal axis of the installation tool 20 by the angle β and slopes negatively (i.e., slopes towards the large cavity 84 from left to right) for clockwise installation of the collar 16. Angle β desirably equals about 17°. The intersection between the flat plane 114 and the oblique relief plane 116 defines the oblique driving ridge 110 which contacts the collar rearward portion 56 during installation.

With reference to FIGS. 7, and 10, the small cavity 86 also includes a pair of oblique swaging ridges 120. The oblique swaging ridges 120 swage the material of the rearward portion 56 of the collar 16 into the flutes 50 of the fastener 14 to lock the collar 16 onto the fastener 18 after the desired preload has been produced. In addition, the oblique swaging ridges 120 hold the installation tool 18 on the collar 16 and prevent the installation tool 18 from prematurely camming-off of the collar 16 during the swaging process, as discussed in detail below.

Figure 12:
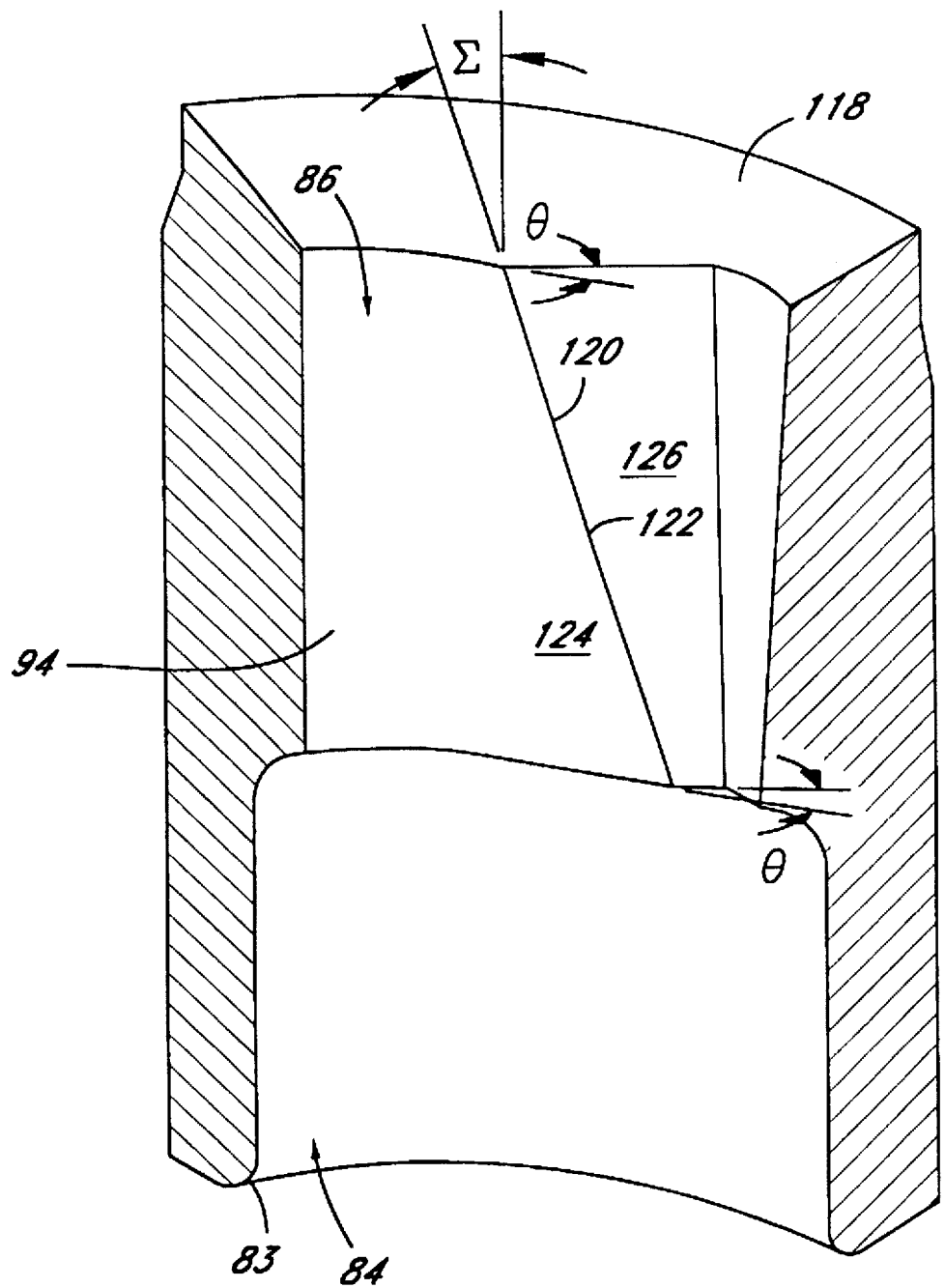
FIG. 12 is a perspective sectional view of the installation tool taken along line 12—12 of FIG. 7.

The oblique swaging ridges 120 are disposed diametrically opposite each other on the interior wall of the small cavity 86. As illustrated in FIG. 12, each oblique swaging ridge 120 extends along the entire axial length of the small cavity 86 and is skewed at an angle Σ from the longitudinal axis of the installation tool 18. In the illustrated embodiment, the angle Σ substantially equals the angle β by which the oblique driving ridges 110 are skewed from the longitudinal axis of the installation tool 18.

With reference to FIGS. 7 and 10, each oblique swaging ridge 120 has a midpoint 122 that lies at a point bisecting the oblique swaging ridge 120. As illustrated in FIG. 7, the midpoint 122 is positioned from the midpoint 111 of the oblique driving ridge 110 about the circumference of the small cavity 86 by about 75°. In the illustrated embodiment, the midpoint 122 is also offset from the minor axis by an angle K on an opposite side of the minor axis from the corresponding driving ridge 110. In the illustrated embodiment, the offset angle K is about 15°.

As illustrated in FIG. 10, the distance Z between the midpoints 122 of the oblique swaging ridges 120 is slightly greater than the minor diameter of the collar rearward portion 56, and is significantly less than the major diameter of the collar rearward portion 56. In an exemplary embodiment for a ¼" collar, where the minor diameter of the rearward portion 56 equals 0.312", the distance Z between the midpoints 122 of the oblique swaging ridges 120 is equal to approximately 0.317". The distance Z between the oblique swaging ridges 120 advantageously equals about the diametric dimension across the collar rearward portion 56 at a point offset from the minor axis of the collar rearward portion 56 by approximately 15°.

As best seen in FIG. 12, an intersection of a flat plane 124 and an oblique relief 126 forms each oblique swaging ridge 120. The flat plane 124 lies generally parallel to the longitudinal axis of the installation tool 18 and, as best seen in FIG. 10, lies generally along a cord of the arc defined by swaging surface radius $r_2$. At the center point of the oblique ridge 120, the flat plane 124 is perpendicular to a radius originating from the focal center of the tool cavity.

The oblique relief plane 126 truncates the flat plane 124 and angles outwardly from the flat plane 124 by an angle θ which approximately equals 12°. Desirably the intersection is radiused for smoothness. In addition, as best illustrated in FIG. 12, the oblique plane 126 is skewed with respect to the longitudinal axis of the installation tool by the angle Σ and slopes negatively (i.e., slopes towards the large cavity from left to right) for clockwise installation of the collar 16. Angle Σ is on the order of 6° to 7° which is equal to angle β. The intersection between the flat plane 124 and the oblique relief plane 126 defines the oblique swaging ridge 120 which contacts the collar rearward portion 56 during the swaging step of the installation process, as described below.

With reference to FIG. 10, the major axis and the minor axis of the small cavity 86 divide the small cavity 86 into four quadrants. The quadrants trailing the minor axis as the installation tool 18 is rotated in the clockwise direction include the oblique swaging ridges 120. As a result, the collar locks onto the fastener 14 through a 180° rotation of the installation tool 18, as discussed in detail below.

The installation tool 18 is preferably made of hardened steel, carbide or other suitable high strength metal alloys. The installation tool 18 has a yield strength significantly greater than that of the collar material in order to deform the collar 16 at the specific preload while substantially maintaining the shape of the installation tool axial bore 80 during the installation process.

In the illustrated embodiment, the installation tool 18 is made of hardened steel and is formed from a round donut-shaped slug extruded into the configuration described above. Specifically, the slug is placed into a die comprising an extrusion bearing and a mandrel, with the donut-shaped slug fitting over the mandrel.

Desirably, the extrusion bearing has a polygonal shape conforming to a standard box wrench configuration. However, the extrusion bearing could have other configurations, such as, for example, an elliptical shape, for adapting the installation tool 18 to a pneumatically driven wrench.

The mandrel has an elliptical cross-sectional shape segment configured in accordance with the above description of the small cavity's 86 elliptical shape. The mandrel additionally includes a larger generally elliptical cross-sectional shape portion configured in accordance with the above description of the large cavity 84 and includes reliefs and flats which form the driving ridges 98. Under pressure, the slug conforms to the shape defined between the extrusion bearing and the mandrel.

A second mandrel, pushing from the rearward end of the slug, subsequently forces the first mandrel out of the formed small cavity 86. During this process, the second mandrel hobs the small cavity 86, thereby forming the oblique driving ridges 110, 120 into the interior wall of the small cavity 86 of the installation tool 18.

Although FIGS. 8 through 10 illustrate the oblique relief planes 116, 126 extending along the entire axial height of small cavity 86, for manufacturing purposes the oblique relief plane 116 can extend from a rearward end 118 of the installation tool 18 to a point proximate to the transition between the large cavity 84 and the small cavity 86, but not into the large cavity 84. This configuration of the installation tool 18 prevents the formation of a burr at the transition between the cavities 84, 86.

As an alternative to forming the driving ridges 110, 120 as described above, it is also contemplated that the driving ridges 110, 120 can be formed by drilling holes into the slug, the hole, in part, break through the walls of the cavities 84, 86. Thereafter, pins are press fit into the holes such that a portion of the pins' peripheries exterior extend into the cavities 84, 86 to form the driving ridges 110, 120 at the positions described above.

If the tool 18 is made of a harder material, such as, for example, carbide, the driving and swaging ridges on the large and small cavities 84, 86 can be formed by EDM technology. It is also contemplated that the installation tool 18 can be formed by other processes which will be readily apparent to those skilled in the art.

Method of Installing the Fastener System

Installation of the fastener system 10 will now be described with primary reference to FIGS. 1, 13 and 14. As illustrated in FIG. 1, the threaded fastener 14 is inserted through the work pieces 12 which are being fastened together, and the collar 16 is placed on the threaded portion 26 of the fastener 14. With the installation tool 18 press-fit into the wrench 20, the installation tool 18 is slid over and onto the duplex collar 16. The installation tool engagement face 82 and rounded edge 83 abut against the collar base shoulder 57 and fillet 57a registering the installation tool 18 with the duplex collar 16 for axial positioning.

The small cavity 86 only contacts the upper 90% of the collar rearward portion 56 when registered. In other words, a forward segment of the rearward portion 56 having an axial height of about 0.5 P remains unworked during the installation process described below. By keeping the transition shoulder 130 (FIG. 8) between the two tool cavities 84 and 86 from contacting the transition shoulder 132 (FIG. 3) between collar barrel portions 54 and 56, axially displaced material from the cam regions 76 of nut portion 54 will occupy the provided gap without forcing the installation tool to cam-off. The torque needed to swage nut portion 56 also will be less than the preload torque by limiting the length of the portion 56 engaged by the tool 18.

The wrenching key 33 extends through the installation tool 18 along the longitudinal axis of the fastener 14. The wrenching key 33 closely fits inside the fastener cavity 32, holding the fastener 14 stationary while the collar 16 is tightened onto the fastener 14. As a result, the collar 16 can be installed from one side of the joined materials 12 (i.e., from the blind side).

Rotation of the installation tool 18 brings the driving ridges 98, 110 of the large and small cavities 84, 86 into contact with the collar central portion 54 and the collar rearward portion 56, respectively. Further rotation of the installation tool 18 applies a torque to the rearward portion 56 and to the central portion 54 along the driving ridges 98, 110 contacting the collar 16, which threads the collar 16 onto the threaded fastener 14.

Initially, the resistance to rotation is minimal and the installation tool 18 and collar 16 rotate at the same rate. At this stage of the installation process, the central portion 54 has a generally undeformed, elliptical cross-sectional shape, as shown in FIG. 13, and the rearward portion 56 also has a generally undeformed, elliptical cross-sectional shape, as illustrated in FIG. 14. Because the shapes of the central portion 54 and rearward portion 56 are unmodified, the driving ridges 98, 110 of the large and small cavities 84, 86 continue engaging the central and rearward portions 54, 56, respectively, and applying a torque to the duplex collar 16.

The resistance to threading eventually increases as the collar 16 is tightened onto the threaded fastener 14. When the applied torque approaches the preload torque, the driving ridges 98, 110 begin digging into the central portion 54 and the rearward portion 56, respectively. Because the installation tool 18 digs into the collar 16, as opposed to pushing on the collar 16, the installation tool 18 generates higher preloads than those produced by prior installation tools contacting a collar with flats or arcuate surfaces.

The pure rotational force (i.e., the torque) exerted by the installation tool 18 along each oblique driving ridge 110 is split into rectangular force components that act perpendicular and parallel to the lay of the oblique driving ridge 110, as schematically illustrated in FIG. 8. The force component acting in the direction of the oblique driving ridge 110, exerts an axial thrust on the installation tool 18, urging the installation tool 18 onto the collar 16 to counteract the natural reactionary tendency to cam-off.

Advantageously, at this stage the installation tool 18 only slightly compresses the duplex collar 16 into the threads 26 of the fastener 14 because the installation tool 18 contacts the collar only at its driving ridges 98, 110, minimizing the radial compressive force it exerts on the collar 16. Importantly, the driving ridges 98, 110 of the installation tool 18 have sufficient axial lengths, spreading the applied torque over a large enough collar area such that the collar 16 withstands deformation up until the torque required to produce the desired preload.

Additionally, the present flute design of the fastener 14 does not exacerbate the effect of elastically compressed collar material because the flute design prevents premature captivation of the collar 16. Collar material compressed into the flutes 50 travels over the convex surface 36 of the fastener thread recesses 34 as the collar 16 continues to rotate. Blending the bottom of the recesses 34 in the direction in which the collar 16 turns delays fastener 14 capture by the rotating collar 16, thereby allowing a high preload to develop on the joint 12 without over-stressing the hexagon key 33.

Before the applied torque approaches the torque required to produce preload, the driving ridges 98, 110 begin to plastically deform the collar central and rearward portions 54, 56, pushing up crests of collar material to elevate torque and encourage collar rotation. At the point of producing the desired preload, the driving ridges 98, 110 have wiped the material of the collar camming surface 76, 78 around the circumference of the central portion 54 and the rearward portion 56 proximate to the major axes of the collar 16. FIG. 13 illustrates the deformed configuration of the collar central portion 54 in phantom line and FIG. 14 illustrates similar results for rearward barrel portion 56 in phantom line. Only the material at the camming region 78 is wiped around the major axis of the collar 16, as seen in FIG. 14.

Circumferential displacement of material rather than radially inward displacement is important during the preload phase of the installation cycle. And because the pin flutes 50 do not extend into the central nut portion 54 any small component of radial compression by ridge pair 98 is inconsequential. Not so, however, with ridge pair 110 because pin flutes 50 are within nut portion 56. But the convex shape of the flutes 50 that chase and blend with the circumference of the pin thread major diameter, discourages any tendency of the elastically compressed nut to grab the pin 14. As a result the reaction strain on the constraining hex key remains low.

The oblique swaging ridges 120 trailing the oblique driving ridges 110 rotate into engagement with the collar rearward portion 56 as the installation tool 18 continues its rotation. Importantly, this occurs after the applied torque has fallen off the preload value so as not to over stress the wrenching key 33. The oblique swaging ridges 120 plastically deform the rearward portion 56 in the circumference direction as the installation tool 18 is rotated to sweep its minor diameter past the major axis of the collar rearward portion 56. The swaging ridges 120, which are spaced apart by a distance Z that is only slightly larger than the minor axis of the smaller cavity 86 (e.g., 0.005 inches), swage the material of the collar rearward portion 56 into the fastener flutes 50.

The pair of oblique swaging ridges 120 function alone during the final swaging phase when the installation tool 18 pivots around the collar which is now stationary because of tightness. The slanting ridge pair 120 prevent the tool from camming-off while swaging nut portion 56 in a manner similar to that described above in connection with the oblique driving ridges 110.

Referring to FIG. 14, the rearward portion 56 of the collar 16 is deformed radially inwardly from its elliptical, out-of-round shape to a generally circular shape (not shown) which prevents the application of further torque. Although some collar material is initially displaced circumferentially, from the major axis towards the minor axis, the swaging ridges 120 eventually swage this material into the fastener flutes 50 which desirably have sufficient void volume to receive a majority of the radially deformed collar material.

The flats 124 finish swaging the collar rearward portion 56 as they slip around the major axis of the collar 16. At this stage, the collar 16 is completely swaged onto the fastener and the installation tool 18 rotates to a non-working position (which enables disengagement), 180° from where the installation tool began rotating about the collar 16. Consequently, the installation tool 18 can be used in more confined areas than prior installation tool which require 360° of tool rotation to complete the swaging operation.

Once the collar rearward portion 56 completely deforms, the installation tool 18 cams off from the duplex collar 16 with little encouragement from the technician.

The present invention advantageously separates the generation of the preload from the formation of the lock, by using the central portion 54 to generate a majority of the preload and the rearward portion 56 to form the lock. This feature is taught by U.S. Pat. No. 5,145,300, which is hereby incorporated by reference. The subject matter of the present application and of U.S. Pat. No. 5,145,300 were, at the time the inventions were made, subject to an obligation of assignment to the same person.

The present designs of the duplex collar 16, the fastener flute 50 and the installation tool 18 significantly reduce precapture and elastic radial compression experienced with prior locking fastener systems. Thus, the present fastener system 10 enhances the repeatability and predictability of preload values produced at the junction of the joined materials 12.

Modifications and variations of the embodiments described above may be made by those skilled in the art while remaining within the true scope and spirit of this invention. For instance, oblique driving ridges may be disposed in the large cavity of the installation tool. In addition, although the tool has been solely described as being formed from a single piece of material, the tool could consist of at least two separate rings press-fit into the tool in the desired orientation. Finally, it is understood that while the installation tool of the present invention is shown and described for clockwise rotation, the driving ridges could be disposed for counter-clockwise rotation of the installation tool. Accordingly, the scope of the invention is intended to be defined only by the claims which follow.

What is claimed is:

1. In combination, a collar of a fastener system and an installation tool for installation tool for installing the collar, said collar having a generally cylindrical forward portion, a generally elliptical central portion having diametrically opposed camming regions proximate to a major axis of the central portion, and a generally elliptical rearward portion having diametrically opposed camming regions proximate to a major axis of the rearward portion, and said installation tool comprising a housing defining a first cavity extending from an engagement end into the housing and opening into a second cavity defined by said housing, said first cavity being configured to receive the collar elliptical central portion with the wall of said first cavity including a first pair of diametrically opposed driving ridges spaced apart from each other by a distance X which substantially equals a diametric distance between the camming regions of the collar elliptical central portion, said second cavity being configured to receive the collar elliptical rearward portion, a wall of said second cavity including a second pair of diametrically opposed driving ridges spaced apart from each other by a distance Y which substantially equals a diametric distance between camming regions of the collar elliptical rearward portion, each driving ridge of said first and second pair of driving ridges being formed by two surfaces that each recede away from a center of the corresponding cavity.

2. The combination of claim 1, wherein said second cavity wall additionally includes a pair of swaging ridges which are formed on diametrically opposite surfaces of said second cavity wall.

3. The combination of claim 2, wherein said second cavity has generally an elliptical shape and said swaging ridges on said second cavity wall are off-set by about 15° from a minor axis of said second cavity.

4. The combination of claim 2, wherein said swaging ridges of said second cavity are spaced apart from each other by a distance Z which is slightly larger than a minor diameter of the collar elliptical rearward portion.

5. The combination of claim 2, wherein one of said swaging ridges is positioned behind one of said driving ridges in said second cavity such that said swaging ridge trails the corresponding driving ridge as said installation tool is rotated.

6. The combination of claim 5, wherein each swaging ridge lies about 75° behind the corresponding driving ridge about the periphery of the second cavity.

7. The combination of claim 2, wherein said swaging ridges of said second cavity are oblique relative to a longitudinal axis of the tool.

8. The combination claim 1, wherein said first cavity and second cavity are generally concentrically positioned about a longitudinal axis of said housing.

9. The combination of claim 8, wherein said driving ridges of said second cavity are oblique relative to said longitudinal axis.

10. The combination of claim 9, wherein said driving ridges of said first cavity are oblique relative to said longitudinal axis.

11. The combination of claim 1, wherein the distance X substantially equals a diametric distance across the collar central portion at a point off-set from the central portion major axis by approximately 15° to 30°, and said distance Y substantially equals a diametric distance across the collar rearward portion at a point off-set from the rearward portion major axis by approximately 15° to 30°.

12. The combination of claim 11, wherein said distance X substantially equals a diametric distance across the collar central portion at a point off-set form the central portion major axis by about 20°, and said distance Y substantially equals a diametric distance across the collar rearward portion at a point off-set from the rearward portion major axis by about 20°.

13. The combination as defined in claim 1, wherein said housing has polygonal-shaped periphery configured to engage a standard ratcheting box wrench.

14. The combination as defined in claim 1, wherein said engagement end of said tool is adapted to engage a shoulder on the collar between the forward portion and the central portion so as to register said tool on the collar.

15. The combination as defined in claim 14, wherein said engagement end of said tool includes a rounded edge about said first cavity, said rounded edge configured to mate with a correspondingly shaped fillet on the collar between the shoulder and the collar central portion.

16. The combination as defined in claim 1, wherein said first cavity and said second cavity have generally elliptical shapes, each cavity defining a major axis and a minor axis.

17. The combination as defined in claim 16, wherein the major axes of the first cavity and the second cavity are generally aligned and the minor axes of the first cavity and the second cavity are generally aligned.

18. The combination as defined in claim 1, wherein said driving ridges on the second cavity are arranged within the tool to extend along a portion of an entire axial length of the the second cavity.

19. The combination as defined in claim 18, wherein said driving ridges on said second cavity are arranged so as not to contact a section of the collar rearward portion proximate to the collar central portion.

20. The combination as defined in claim 19, wherein a pair of diametrically opposite swaging ridges are formed on said second cavity wall, said swaging ridges being arranged so as not to contact the section of the collar rearward portion proximate to the collar central portion.

21. The combination as defined in claim 1, wherein said housing additionally defines a standard socket aperture configured to engage a standard lug of a socket wrench.

22. The combination of claim 1 additionally comprising a transition shoulder formed between the first and second cavities, the transition shoulder being arranged within the tool to distance the transition shoulder from a step on the collar, which occurs between the central and reward collar portions, with the tool positioned on the collar, whereby a relief is formed between the tool and the step of the collar.

23. An installation tool comprising a housing defining a first cavity that extends from an engagement end into the housing and opens into a second cavity defined within the housing, said first cavity including a first pair of driving ridges and the second cavity including a second pair of driving ridges, each pair of driving ridges being arranged within the respective cavity such that opposing points along the corresponding pair of driving ridges lie on an ellipse that has major and minor axes, said opposing points being displaced from the major and minor axes, each driving ridge of said first and second pair of driving ridges being defined by a pair of surfaces that recede outwardly from the respective ellipse, and an interior area within each ellipse defining an elliptical opening for receiving at least a portion of a workpiece.

24. An installation tool as in claim 23, wherein said opposing points of each pair of driving ridges are offset from the major axis of the corresponding ellipse by approximately 15° to 30°.

25. An installation tool as in claim 24, wherein said opposing points of each pair of driving ridges are offset from the major axis of the corresponding ellipse by about 20°.

26. An installation tool as in claim 24, wherein said second cavity includes a pair of swaging ridges which are formed on opposite sides of the second cavity, and the swaging ridges are arranged within the second cavity such that opposing points along the pair of swaging ridges lie on the ellipse defined between opposing points of the driving ridges of the second cavity, said opposing points of the swaging ridges being displaced from the major and minor axes of said ellipse.

27. An installation tool as in claim 26, wherein said opposing points of said swaging ridges being offset by about 15° from the minor diameter of said ellipse.

28. An installation tool as in claim 23, wherein the first and second cavities are positioned about a longitudinal axis of the tool.

29. An installation tool as in claim 28, wherein the ellipses defined between each pair of driving ridges are arranged such the major and minor axes of each ellipse intersect at a point along the longitudinal axis.

30. An installation tool as in claim 28, wherein the driving ridges of the second cavity are oblique relative to the longitudinal axis.

31. An installation tool as in claim 30, wherein the driving ridges of the first cavity are oblique relative to the longitudinal axis.

32. An installation tool for installing a fastener system by rotating the tool in a designed rotational direction, comprising a housing defining a first cavity extending from an engagement end into the housing and opening into a second cavity defined by said housing, said first and second cavities being arranged about a longitudinal axis of the tool, said first cavity being defined at least in part by a first internal wall, said first internal wall including at least one driving ridge, said second cavity being defined at least in part by a second internal wall, said second internal wall including at least one driving ridge, each driving ridge being formed by a pair of surfaces which recede outwardly from the longitudinal axis, and at least one of the driving ridges being obliquely positioned relative to the longitudinal axis and sloping toward an end of the second cavity distal of the first cavity in a direction corresponding to the designed rotational direction of the tool.

33. The installation tool as in claim 32, wherein the second cavity includes another driving ridge, the driving ridges being positioned on opposite sides of the cavity, and each driving ridge is obliquely positioned relative to the longitudinal axis.

34. The installation tool as in claim 33, wherein the wall of the second cavity additionally includes a pair of swaging ridges, each swaging ridge being obliquely positioned relative to the longitudinal axis of the tool.

* * * * *